US012147900B2

(12) United States Patent
Narain et al.

(10) Patent No.: US 12,147,900 B2
(45) Date of Patent: Nov. 19, 2024

(54) VERIFICATION AND SYNTHESIS OF CYBER PHYSICAL SYSTEMS WITH MACHINE LEARNING AND CONSTRAINT-SOLVER-DRIVEN LEARNING

(71) Applicant: Perspecta Labs Inc., Basking Ridge, NJ (US)

(72) Inventors: Sanjai Narain, Basking Ridge, NJ (US); Emily Chun Mak, Basking Ridge, NJ (US)

(73) Assignee: Peraton Labs Inc., Basking Ridge, NJ (US)

( * ) Notice: Subject to any disclaimer, the term of this patent is extended or adjusted under 35 U.S.C. 154(b) by 719 days.

(21) Appl. No.: 16/713,779

(22) Filed: Dec. 13, 2019

(65) Prior Publication Data

US 2024/0202525 A1 Jun. 20, 2024

Related U.S. Application Data

(60) Provisional application No. 62/805,165, filed on Feb. 13, 2019.

(51) Int. Cl.
*G06N 3/08* (2023.01)
*G06N 3/082* (2023.01)

(52) U.S. Cl.
CPC .................. *G06N 3/082* (2013.01)

(58) Field of Classification Search
CPC ..................................... G06N 3/082
See application file for complete search history.

(56) References Cited

U.S. PATENT DOCUMENTS

2012/0331115 A1\* 12/2012 Narain ................ H04L 41/0826
709/220

OTHER PUBLICATIONS

Wilson, Zachary T. et al. "The Alamo approach to machine learning" arXiv [Published 2017] [Retrieved 2022] <URL: https://arxiv.org/abs/1705.10918> (Year: 2017).\*
Malvik, Arnt Gunnar et al. "Data Driven Real-Time Petroleum Production Planning using Optimization and Neural Networks" NTNU Masters Thesis [Published 2018] [Retrieved 2022] <URL: https://ntnuopen.ntnu.no/ntnu-xmlui/handle/11250/2616244> (Year: 2018).\*

(Continued)

*Primary Examiner* — Van C Mang
(74) *Attorney, Agent, or Firm* — Heslin Rothenberg Farley & Mesiti P.C.; Rachel L. Pearlman, Esq.

(57) ABSTRACT

In a computer-implemented method, computer program product, and computer system, program code executing on a processor(s) generates input-output pairs, to form a training set for machine learning and generates a machine learning model of a cyber physical system by utilizing a machine learning algorithm and the training set to train the machine learning model. The program code converts the trained machine learning model into an equivalent constraint and optimizes objective functions subject to the constraint by utilizing one or more constraint solvers to compute an input-output pair. The program code determines if the computed input-output pair, is within an error tolerance and based on determining that it is, either utilizes it as a solution or adds it to the training set (and continues training). If the pair is not within the tolerance, the program code utilizes it as a solution or adds it to the training set (and continues training).

10 Claims, 10 Drawing Sheets

(56) References Cited

OTHER PUBLICATIONS

Say, B., Wu, G., Zhou, Y. Q., & Sanner, S. (2017, August). Nonlinear Hybrid Planning with Deep Net Learned Transition Models and Mixed-Integer Linear Programming. in IJCAI (pp. 750-756) <URL: https://researchmgt.monash.edu/ws/portalfiles/portal/309743110/303661421_oa.pdf> (Year: 2017).*

De Raedt, L., Passerini, A., & Teso, S. (2018, April). Learning constraints from examples. in Proceedings of the AAAI Conference on Artificial Intelligence (vol. 32, No. 1). (Year: 2018).*

Akintunde, M., Lomuscio, A., Maganti, L., & Pirovano, E. (2018, September). Reachability analysis for neural agent-environment systems. in Sixteenth international conference on principles of knowledge representation and reasoning. (Year: 2018).*

Dragone, P., Erculiani, L., Chietera, M. T., Teso, S., & Passerini, A. (2016). Constructive layout synthesis via coactive learning. in Constructive Machine Learning workshop, NIPS. (Year: 2016).*

Julian, Kyle D., and Mykel J. Kochenderfer. "Neural network guidance for UAVs." AIAA Guidance, Navigation, and Control Conference. 2017. (Year: 2017).*

\* cited by examiner

| Environment constraints | Solution to $safe\_config(s_1, s_2, damp, stop)$ | | | |
|---|---|---|---|---|
| | $s_1$ | $s_2$ | damp | stop |
| $s_2 = 0$ | 1 | 0 | 0.12 | 28.38 |
| $s_2 = 0.2$ | 3.9 | 0.2 | 0.13 | 20 |
| $s_2 = 0.6$ | 3.04 | 0.6 | 0.2 | 36.09 |
| $s_2 = 0.9$, *stop in* [20, 25] | 4 | 0.9 | 0.22 | 20 |
| Unconstrained. See third animation in next slide | 1 | 1 | 0.1 | 24.17 |
| $damp >= 0.3$ | No solution found. Steering angle is too high to avoid collision with road divider | | | |

VERIFICATION AND SYNTHESIS OF CYBER PHYSICAL SYSTEMS WITH MACHINE LEARNING AND CONSTRAINT-SOLVER-DRIVEN LEARNING

CROSS REFERENCE TO RELATED APPLICATION

This application claims priority to U.S. Provisional Application No. 62/805,165 filed Feb. 13, 2019, entitled, "Efficient Verification and Synthesis of Cyber Physical Systems With Machine Learning and Constraint-Solver-Driven Learning" which is incorporated herein by reference in its entirety.

GOVERNMENT RIGHTS STATEMENT

This invention was made with U.S. Government support under contract FA8750-18-C-0184 for the Defense Advanced Research Projects Agency (DARPA). The government has certain rights in the invention.

BACKGROUND OF INVENTION

Cyber physical systems (CPS) integrate networking, communications, sensing, computation and control capabilities into physical devices and infrastructure including, but not limited to: robotics systems, smart grids, autonomous vehicles and process control systems (e.g., embedded systems). CPS involves transdisciplinary approaches, merging theory of cybernetics, mechatronics, design, and process science. In embedded systems, the emphasis tends to be more on the computational elements, and less on an intense link between the computational and physical elements. CPS is also similar to the Internet of Things (IoT), sharing the same basic architecture; nevertheless, CPS presents a higher combination and coordination between physical and computational elements. IoT itself is sometimes considered a CPS. Unlike more traditional embedded systems, a full-fledged CPS is typically designed as a network of interacting elements with physical input and output instead of as standalone devices. Hence, CPS is often relevant to robotics and sensor networks with intelligence mechanisms of computational intelligence leading the pathway. Ongoing advances in science and engineering improve the link between computational and physical elements by means of intelligent mechanisms, increasing the adaptability, autonomy, efficiency, functionality, reliability, safety, and usability of cyber-physical systems. Areas in which CPSs are being utilized include, but are not limited to: intervention (e.g., collision avoidance); precision (e.g., robotic surgery and nano-level manufacturing); operation in dangerous or inaccessible environments (e.g., search and rescue, firefighting, and deep-sea exploration); coordination (e.g., air traffic control, war fighting); efficiency (e.g., zero-net energy buildings); and augmentation of human capabilities (e.g., in healthcare monitoring and delivery).

SUMMARY OF INVENTION

Shortcomings of the prior art are overcome and additional advantages are provided through the provision of a method for verification and synthesis of cyber physical systems. The method includes, for instance: generating, by one or more processors, input-output pairs, to form a training set for machine learning; generating, by the one or more processors, a machine learning model of a cyber physical system, wherein the generating comprises utilizing a machine learning algorithm and the training set to train the machine learning model; converting, by the one or more processors, the trained machine learning model into an equivalent constraint; optimizing, by the one or more processors, objective functions subject to the constraint, wherein the optimizing comprises utilizing one or more constraint solvers to compute an input-output pair; determining, by the one or more processors, if the computed input-output pair, is within an error tolerance of an input-output pair produced by a cyber physical system evaluator; based on determining that the computed input-output pair is within the error tolerance, selecting an action from the group consisting of: utilizing the computed input-output pair as a solution and adding the computed input-out pair to the training set to generate an updated training set; and based on determining that the computed input-output pair is not within the error tolerance, adding the computed input-output pair to the training set to produce the updated training set.

Shortcomings of the prior art are overcome and additional advantages are provided through the provision of a computer program product for verification and synthesis of cyber physical systems. The computer program product comprises a storage medium readable by a processing circuit and storing instructions for execution by the processing circuit for performing a method. The method includes, for instance: generating, by one or more processors, input-output pairs, to form a training set for machine learning; generating, by the one or more processors, a machine learning model of a cyber physical system, wherein the generating comprises utilizing a machine learning algorithm and the training set to train the machine learning model; converting, by the one or more processors, the trained machine learning model into an equivalent constraint; optimizing, by the one or more processors, objective functions subject to the constraint, wherein the optimizing comprises utilizing one or more constraint solvers to compute an input-output pair; determining, by the one or more processors, if the computed input-output pair, is within an error tolerance of an input-output pair produced by a cyber physical system evaluator; based on determining that the computed input-output pair is within the error tolerance, selecting an action from the group consisting of: utilizing the computed input-output pair as a solution and adding the computed input-out pair to the training set to generate an updated training set; and based on determining that the computed input-output pair is not within the error tolerance, adding the computed input-output pair to the training set to produce the updated training set.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

It should be appreciated that all combinations of the foregoing aspects and additional concepts discussed in greater detail below (provided such concepts are not mutually inconsistent) are contemplated as being part of the inventive subject matter and to achieve the advantages disclosed herein.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Figure 1:
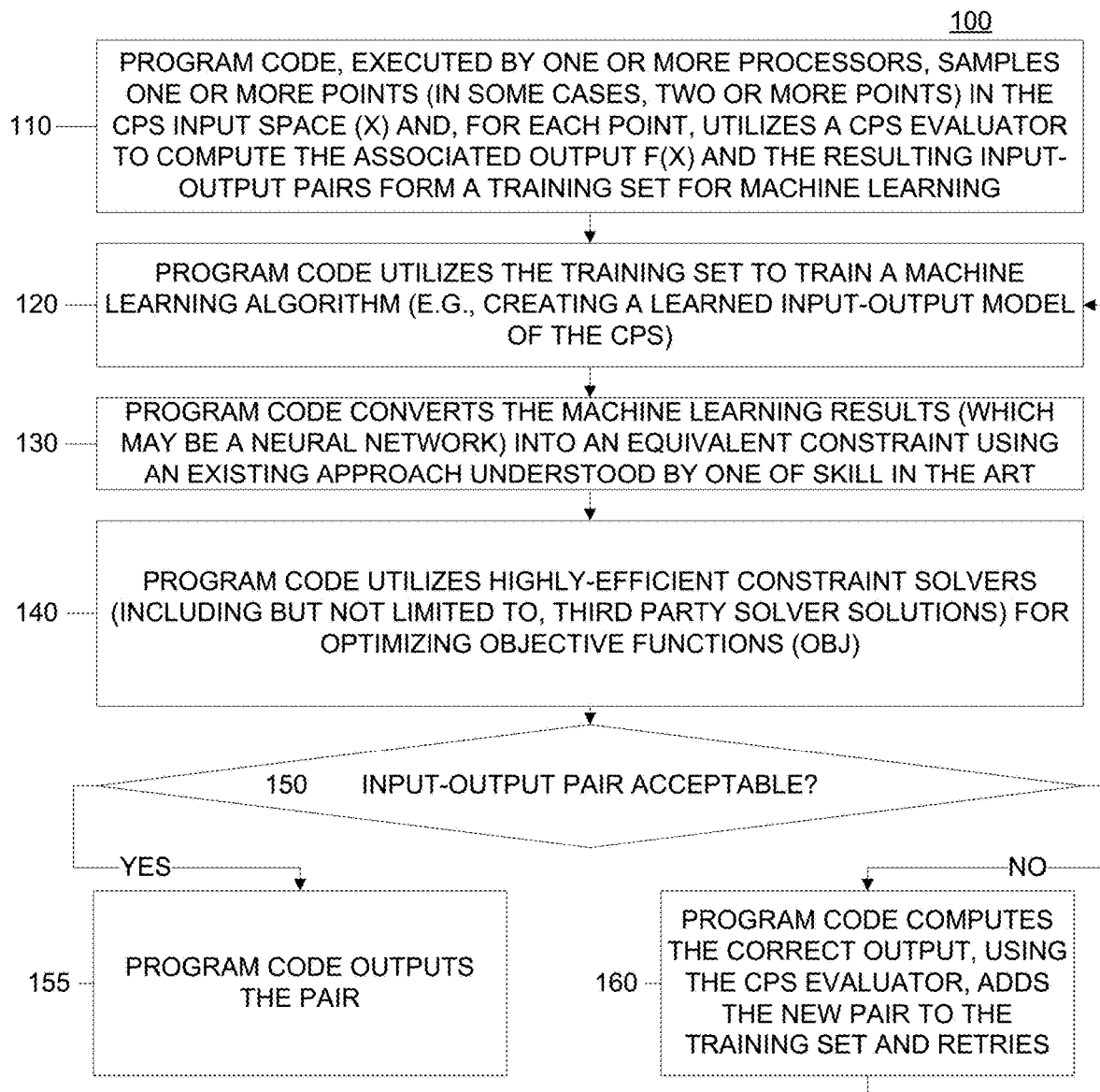
FIG. 1 is a workflow that depicts certain aspects of some embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics professor unit). Additionally, items denoted as processors may include hardware and/or software processors or other processing means, including but not limited to a software defined radio and/or custom hardware.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code includes a program/utility, having a set (at least one) of program modules, stored in a memory.

As discussed above, a CPS can be utilized to make autonomous decisions in what can be understood as mission-critical situations (e.g., robotics systems, smart grids, autonomous vehicles and process control systems). Given the mission-critical nature of a CPS utilized in each of these areas, a need exists to develop methods for verifying each CPS and providing correct-by-construction synthesis. Providing this verification and correct-by-construction synthesis addresses this problem ("PROB"), which is discussed in greater detail below. To this end, embodiments of the present invention include a computer-implemented method, a computer program product, and a computer system that include program code executed by one or more processors (or hardware) that develops approximate solutions to PROB, with controllable levels of accuracy, which addresses the above challenges. In some embodiments of the present invention, program code executed on at least one processor is a CPS evaluator, e.g., a simulator that, given an input computes an output. Thus, the program code in embodiments of the present invention models the CPS to verify its accuracy. A verified CPS can be utilized for its intended application.

In generating a computer model to evaluate a CPS, the program code generates and utilizes a computing model where CPS is modeled by a function F whose input is a vector X and whose output is a vector Y. In embodiments of the present invention, the variables in X and Y can be discrete or continuous. X models design and environment or operation variables and Y models performance metrics or requirements. In embodiments of the present invention, a method of evaluating F is available, e.g., as a simulator. In the simulation performed by the program code, $P(X, Y)$ is a predicate or condition and $Obj(X, Y)$ is an objective function. $F$, $P(X, Y)$, $Obj(X, Y)$ can be non-linear. Thus, the program code can solve a class of CPS synthesis and verification problems by solving the following fundamental problem (PROB, as noted above: PROB: Find values of X and Y that optimize Obj subject to $P(X, Y) \wedge F(X)=Y$ When $P(X, Y)$ and Obj are desirable properties and functions, respectively, then a solution to this problem effectively synthesizes a CPS: it finds an input that when applied to F produces a desirable output and achieves an objective. When P is an undesirable property, and Obj a constant, then the non-existence of a solution to this problem effectively verifies the CPS: it proves that it is not possible that F produce an undesirable output. Note that when Obj is a constant, the problem reduces to one of constraint satisfaction. The solver just has to find a value of X and Y such that $P(X, Y) \wedge F(X)=Y$. The optimal value of the constant is the constant itself.

Embodiments of the present invention, when solving PROB (to verify a CPS), provide advantages over existing methods of CPS verification at least because the computer-implemented method, computer program product, and computer system, discussed herein address certain factors that complicate solving PROB for a CPS. As understood by one of skill in the art, solving PROB is complicated by various factors, some of which are discussed herein. First, solving non-linear constraints implicit in F, P and Obj is a difficult and expensive calculation. Second, it is hard to solve the reverse problem of computing inputs from outputs. CPS evaluators, such as simulators, only work in the forward direction, mapping inputs to outputs. In existing approaches, it was not possible to use these in the reverse direction. The math implicit in this mapping is usually not explicitly available. In the existing approaches, various computations were transformed into numerical methods for solving the constraints and then into computer code. Even if the (non-linear) math were available, it would be hard to solve, as observed above. Third, when the sizes of X and Y are large, then the space over which inputs and outputs have to be searched for synthesis and verification can be astronomical and even infinite.

Embodiments of the present invention include a computer-implemented method, a computer program product, and a computer system that include program code executed by one or more processors (or hardware) that develops approximate solutions to PROB, with controllable levels of accuracy, which addresses the above challenges. As discussed below, in some embodiments of the present invention, because embodiments of the present invention include program code that learns (e.g., machine learning) through iterations of the process, in some embodiments of the present invention, even if a generated by the program code solution is within a predefined desirable threshold and constraints are satisfied, the program code will continue with an iterative process to tune the solution, utilizing the outputs as training data and continuing moving through the processing described below in order to find a "best" or optimized solution.

Embodiments of the present invention are inextricably linked to computing at least because a CPS is a computing technology and the need to verify its functionality, by developing approximate solutions to PROB, with controllable levels of accuracy, is a computing-based solution to this computing issue, as discussed herein, Furthermore, as described in detail herein, this verification process, performed by the program code, is a practical application because it provides an approach to an issue which enables the utilization of CPSs with confidence, in important fields (as discussed above). As will be discussed below, embodiments of the present invention provide significantly more than existing CPS verification approaches, both in efficiency and accuracy. In embodiments of the present invention, the program code can assume a CPS evaluator, e.g., a simulator that, given an input computes an output.

FIG. 1 is a workflow 100 that illustrates various aspects of the present invention and in particular, aspects performed by the program code, executed by at least one processor, to develop approximate solutions to PROB, with controllable levels of accuracy. In some embodiments of the present invention, the program code, executed by one or more processors, samples one or more points (in some cases, two or more points) in the CPS input space (X) and, for each point, utilizes a CPS evaluator to compute the associated output F(X) and the resulting input-output pairs form a training set for machine learning (110). Each pair in this set can be understood as a training instance (for use in the machine learning). In some embodiments of the present invention, rather than learn the entirety of the space, in order to train the neural network, the program code learns a sample of the space and based on this sample, the program code can learn enough of a neural network to provide an accurate solution. This aspect is illustrated herein with example of applying embodiments of the present invention to synthesize a hydrofoil transforming wave energy into forward propulsion, a boat that is propelled by this hydrofoil, and logical CPS e.g., control maneuvers, which include utilizing program code in embodiments of the present invention to model maneuvers as configurable plans. The control maneuver examples include (non-limiting examples) illustrated herein are: 1) finding parameters of sigmoid curve for safe parallel parking with moving obstacles; and 2) robot path planning. These particular examples are discussed in more detail in FIGS. 7-10.

Retuning to FIG. 1, the program code utilizes the training set to train a machine learning algorithm (e.g., creating a learned input-output model of the CPS) (120). In some embodiments of the present invention, the program code utilizes a neural network as the machine learning algorithm to analyze the one or more points in the CPS input space (X) and for each point, and the associated output F(X), and generate the data structures. Neural networks are a biologically-inspired programming paradigm which enable a computer to learn from data. Machine learning based on the utilization of neural networks can be understood as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns and attributes in data. Because of the speed and efficiency of neural networks, especially when parsing multiple complex data sets, neural networks and deep learning provide solutions to ingesting and organizing data from diverse sources. In addition, neural networks can predict additional values— as they are being used to generate inputs and outputs in some embodiments of the present invention. Some embodiments of the present invention may utilize a neural network to predict additional values, for inclusion in the data structure, based on the inputs provided. Utilizing the neural network, the program code can predict subsequent data. The program code obtains (or derives) an array of values (possible attributes) to input into input neurons of the neural network. Responsive to these inputs, the output neurons of the neural network produce an array that includes the identified points as well as the predicted points. The neural network can also be utilized to process the data of multiple users simultaneously, and in processing these data, the program code can generate and predict relationships between points and pairs for utilization in the data structures.

As illustrated in FIG. 1, the program code converts the machine learning results (which may be a neural network) into an equivalent constraint using an existing approach understood by one of skill in the art (130). In some embodiments of the present invention, the program code utilizes highly-efficient constraint solvers (including but not limited to, third party solver solutions) for optimizing objective functions (Obj) (140). Although a variety of constraint solvers can be utilized by the program code, the constraint solver selected in subject to the constraint where both Obj and P(X, Y) are assumed to be amenable to specification in the language of the constraint solver. In some embodiments of the present invention, the program code determines if the input-output pair computed by the constraint solver is acceptable (150). If so, the program code outputs the pair and halts (155). One definition of acceptability is as follows: for the input, the CPS evaluator produces the same output (within an error tolerance) as that produced by the constraint solver. The program code effectively solves a reverse problem of mapping outputs to inputs because constraint solvers do not make a distinction between input and output variables. In particular, the program code utilizes pre-defined performance and requirements metrics (e.g., predefined by a user) and generates design and environment variable values to achieve those metrics and requirements.

In some embodiments of the present invention, the program code determined that the constraint solver is acceptable (in accordance with the constraints) (150) but does not output the pair produced and instead, as when the program code has produced this acceptable solution, the program code computes the correct output, using the CPS evaluator, adds the new pair to the training set and retries the above aspects (160). In some embodiments of the present invention, regardless of the acceptability of the solution, the program code utilizes the solution to enhance the training set a pre-determined (fixed) number of times in order to enable the program code to generate a solution for which the objective function is the best and the constraint is satisfied. The program code that learns (e.g., machine learning) through iterations, in some embodiments of the present invention, even if a solution is within a predefined desirable threshold and constraints are satisfied, the program code will continue with an iterative process to tune the solution. To find the optimum value of an objective function, this procedure can be run several times, which allows the program code to ultimately determine a best value for a given function. Repeating the process iteratively can improve the possibility of finding a "best" solution, as opposed to just an acceptable solution.

The program code also learns from failure (as stated before, embodiments of the present invention employ machine learning for continuous improvement of various aspects). If the input-output pair produced by the constraint solver is incorrect, the program code computes the correct output, using the CPS evaluator, adds the new pair to the training set and retries the above aspects (160). Thus, if the solver produces an input-output pair (x, y) that is deemed incorrect, the new pair added to the training set is NOT (x, y) but instead (x, z) where z is computed by inputting x into the CPS evaluator. In some embodiments of the present invention, instead of computing the correct output, as described in the above aspect, the program code finds a new solution to the constraints and retries the previous steps.

As illustrated in FIG. 1, part of the input-output mapping that is relevant to PROB. Thus, in embodiments of the present invention, the program code need not learn the entire mapping first and then solve PROB. Instead, starting from a seed training set, the program code grows it with new training instances that are deemed relevant to solving PROB, where relevance is determined by the constraint solver. The utilization of the constraint solver provides a significant advantage over existing approaches because it is based on determining relevance by a constraint solver. Based on utilizing the constraint solver, the size of the input space to evaluate (to generate training instances) can be orders of magnitude smaller than that of the full space. Improving upon the current solution produced by the constraint solver is useful and represents an improvement over existing approaches. Due to the statistical nature of machine learning methods, including neural networks, constraint solvers can easily return incorrect input-output pairs. Thus, if its use requires just a small number of inputs to be evaluated, then the need for fine-grained enumeration and evaluation of the input space can be avoided.

Sometimes a CPS cannot be modeled as a single function, but instead as a collection of functions in which inputs of some functions are outputs of others. These functions could represent CPS components or subsystems. A single evaluator for the whole CPS may not be available. To address this domain, aspects of various embodiments of the present invention can be generalized to a multiple function case. This is not the only scenario in which aspects of embodiments of the present invention are relevant, but is presented here for ease of comprehension. The plan from the single function case remains the same: program code executing on at least one processor learns the function via machine learning, converts the results into an equivalent constraint, solves it, and if the solution is unacceptable, uses the solution to derive a correct mapping between inputs and outputs, adds it to the training set and retries. Alternatively, the program code finds a new solution not found so far.

In an example of embodiments of the present invention utilizing multiple functions, the machine learning results/neural networks can be composed by Boolean conjunction of their equivalent constraint representations. Thus, the program code can learn each of the functions separately via machine learning, convert them into constraints, and in accordance with the described aspects of some embodiments of the present invention, explained above, solve their conjunction. In some embodiments of the present invention, the utilization of the constraint solver guarantees that any solution to the conjunction is a solution to the constituent constraints. Furthermore, if the solution is unacceptable, the program code can use the solution to generate new training instances for each of the functions and retry. Some embodiments of the present invention utilize multiple functions to address the challenges associated with large numbers of variables (inputs and outputs). Instead of regarding a CPS as a single function with a large number of inputs and outputs, the approach of embodiments of the invention regards it as a collection of functions as above where each function has a manageable number of inputs and outputs. Such a decomposition can be extracted from CPS modeling tools, including but not limited to by using Ptolemy II, in which systems are specified as a collection of functions. Ptolemy II is in the public domain.

Various additional aspects can be utilized in embodiments of the present invention to improve the feasibility. For example, the program code can apply known sampling methods to produce the initial training set and the new training instances. Examples of such methods are Sobol sequences, random sampling, and Combinatorial Interaction Testing. In some embodiments of the present invention, the program code can compress the neural network using existing neural network compression techniques before converting into a constraint. This can greatly reduce the time needed to solve the constraint. Neural network compression seeks to dramatically reduce neural network size by pruning nodes and edges that do not materially contribute to its accuracy. Neural network compression ratios of 100× are now common with existing methods and new methods are emerging with improved properties. A compressed NN could also result in a much smaller MILP that could be faster to solve.

Figure 2:
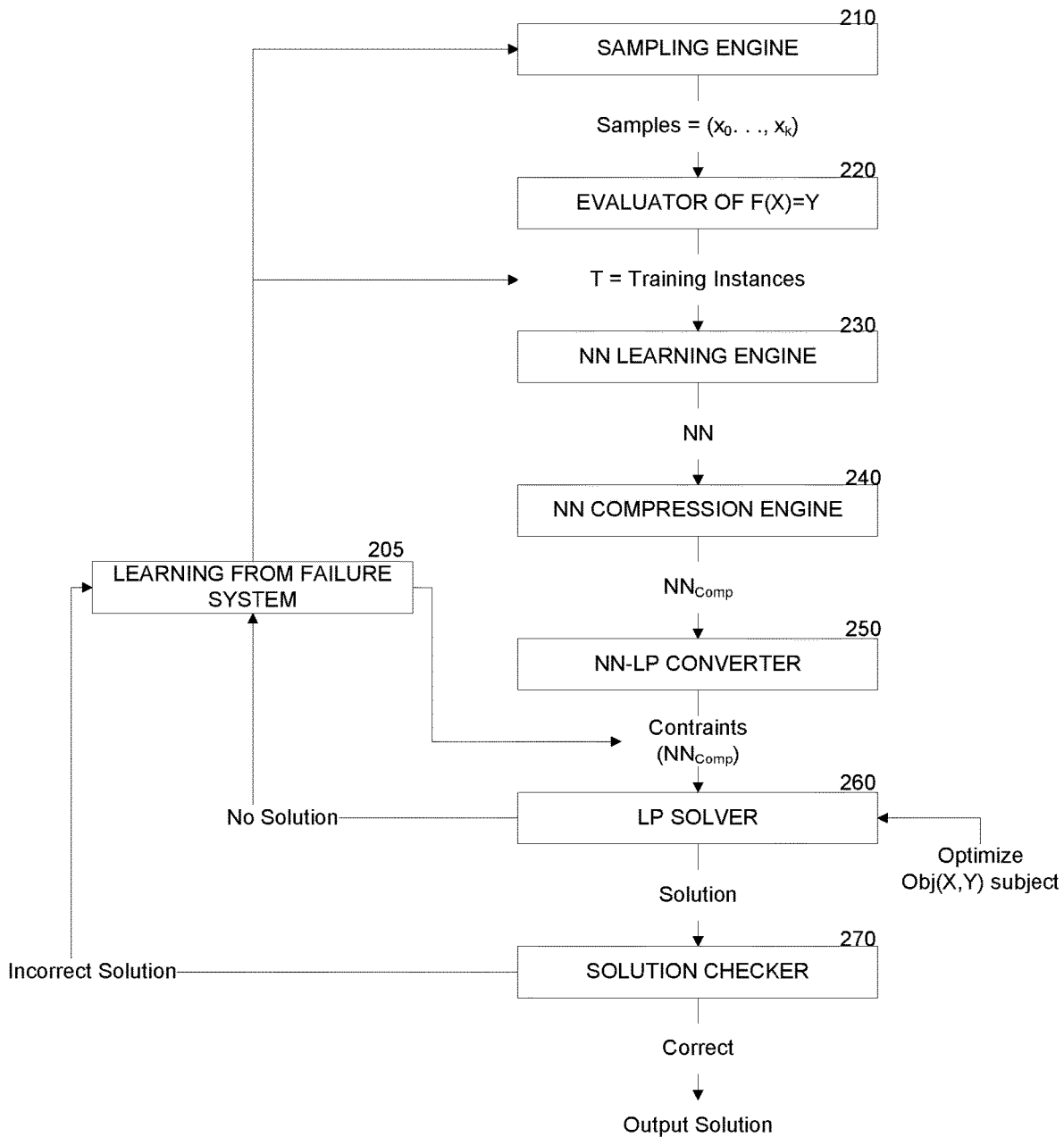
FIG. 2 depicts certain aspects of a technical environment of some embodiments of the present invention.

FIG. 2 is an architecture diagram that illustrates various aspects of the technical architecture 200 of some embodiments of the present invention. The technical architecture 200 also demonstrates various aspects of the workflow of some embodiments of the present invention. In this technical architecture, certain aspects performed by the program code in embodiments of the present invention are illustrated as separate modules. This illustration is meant to clearly display different aspects and does not introduce any limitations regarding how the program code is modularized or augmented. As understood by one of skill in the art, the functionality of the program code can be separated and/or combined across one or more modules or engines, across various embodiments of the present invention.

Returning to FIG. 2, a CPS is modeled by a function $F(X)=Y$ where X and Y are vectors of discrete or continuous variables. $P(X, Y)$ is a predicate or condition and $Obj(X, Y)$ is an objective function. In embodiments of the present invention, the program code, executed by one or more processors, finds values of X and Y that optimize Obj subject to $P(X, Y) \wedge F(X)=Y$. The program code utilizes a simulator to evaluate F. Z is the tuple of variables $(z_0, \ldots, z_k)$. Let $Z=(v_0, \ldots, v_k)$ mean that for each i, the constant $v_i$ is a value of $z_i$. In an embodiment of the present invention, the program code of the sampling engine 210 sets Samples a set of values of X. In embodiments of the present invention, the program code can select a sampling method from various methods, including but not limited to: random, Combinatorial Interaction Testing, and/or Sobol sequence.

In some embodiments of the present invention, program code of an evaluator 220 creates the set T of training instances $(V, F(V))$ for each design point $V \in$ Samples. The learning engine 230 in FIG. 2 is a NN, which is one example of a learning engine 230 that can be utilized in embodiments and this program code train a machine learning algorithm/neural network NN with T. The program code selects various parameters for training the neural network. In one example, one parameter is the weight optimizer for neural network training (e.g., lbfgs or adam). Another parameter is the neural network activation function (e.g., ReLU).

Program code of a compression engine 240 compresses NN to obtain $NN_{comp}$ of similar accuracy. As discussed above, various embodiments of the present invention do not include compression (while others do), but the compression can positively impact performance. The program code can utilize various methods to compress the NN, including but not limited to SCANN and/or NeST.

Returning, to FIG. 2, the program code of a converter 250 transforms $NN_{comp}$ into an equivalent constraint, Constraints $(NN_{comp})$ on X, Y and variables in the hidden layers of $NN_{comp}$. The program code utilizes a constraint solver 270 to optimize $Obj(X, Y)$ subject to $Constraints(NN_{comp}) \wedge P(X, Y)$, where $Obj(X, Y)$ and $P(X, Y)$ are expressed in the specification of the language of the constraint solver. The program code can select a method to utilize in this transformation. For example, a neural network trained with ReLU can be transformed into an equivalent Mixed Integer Linear Program (MILP). When the neural network is transformed into an MILP, constraint solvers such as CBC, CPLEX or GUROBI can be used.

If no solution is found, the program code samples additional values of X depicted in FIG. 2 as learning from failure system 205), and adds them to Samples, from which program code of an evaluator 220 creates the set T of training instances $(V, F(V))$ for each design point $V \in$ Samples. If the program code finds a solution, it is $Sol=\{X=U_0, Y=V_0\}$. The program code of a solution checker 270 determines whether Sol is acceptable w.r.t. F, P, Obj, abbreviated Acc(Sol, F, P, Obj). If the program code determines that the solution is acceptable, the program code outputs Sol as well as an alternate solution $\{X=U_0, Y=F(U_0)\}$. $P(X, Y)$ and $Obj(X, Y)$ can be expressed in the language of the solver. The definition of Acc(Sol, F, P, Obj) can be selected. Where $Sol=\{X=U_0, Y=V_0\}$, a simple definition of Acc is that $V_0$ is a good approximation to $F(U_0)$, e.g., each member in the vector $V_0$ is within a small percentage of the corresponding member in the vector $F(U_0)$. Another definition may be that $P(U_0, F(U_0))$ In some embodiments of the present invention, although the program code determines that the solution is acceptable, the processing by the program code continues and the program code adds $(U0, F(U0))$ to the training set and find another solution and associated value of the objective function. In some embodiments of the present invention, this process, regardless of the acceptability of the solutions derived, is repeated by the program code a pre-determined (fixed) number of times in order to enable the program code to generate a solution for which the objective function is the best and the constraint is satisfied. As explained above, because embodiments of the present invention include program code that learns (e.g., machine learning) through iterations, in some embodiments of the present invention, even if a solution is within a predefined desirable threshold and constraints are satisfied, the program code will continue with an iterative process to tune the solution.

If the program code determines that the solution is not acceptable, the learning engine 205 learns from this circumstance and $T = T \cup \{(U_0, F(U_0))\}$ and this value is utilized by the program code of the learning engine 230 as an additional training instance to train the model, in this case a NN. In some embodiments of the present invention, the program code can add additional training instances $(X, F(X))$ to T for values of X selected by a sampling method.

In some embodiments of the present invention, the program code strengthens the constraint in the solver when the program code utilizes a constraint solver 270, the program code of the constraint solver 270 enforces that the solution should be different from any previous one.

Figure 3:
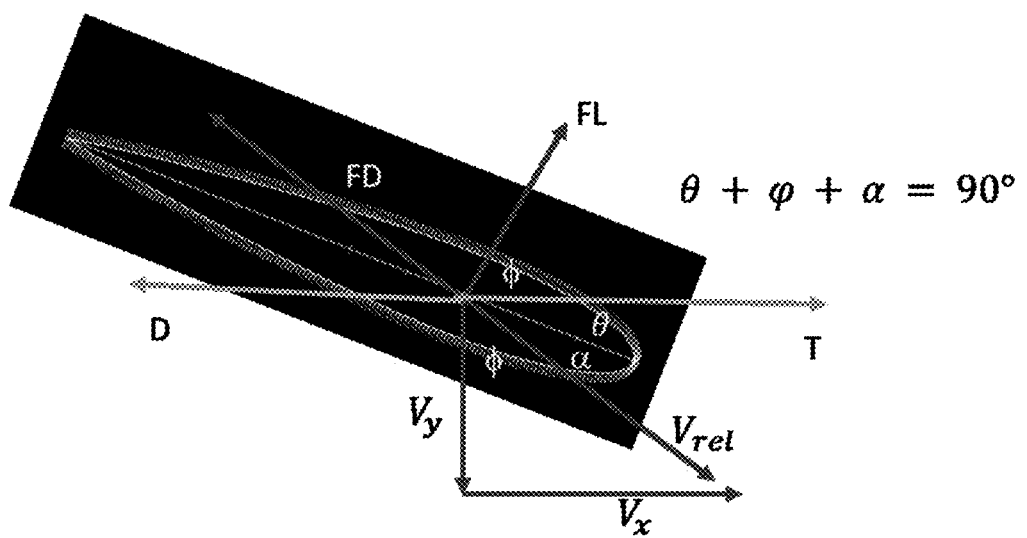
FIG. 3 illustrates an integration of certain aspects of some embodiments of the present invention into a practical application.

A non-limiting application of embodiments of the present invention is in designing a hydrofoil for wave energy propulsion. The application of embodiments of the present invention to this practical application is illustrated in FIG. 3. A hydrofoil that, if moving through water at a given velocity and inclined at a certain angle (of attack) with the horizontal, will produce a given horizontal force. This force can be used to propel a boat purely with wave energy: no external energy source such as diesel or battery is required.

As shown in FIG. 3, the foil rotates about a point near its rounded end at right and has reached θ, its maximum angle with the horizontal. It is sinking due to downward wave motion. Assume it is moving at velocity $V_{rel}$. Let $$\phi = a\tan\left(\frac{V_x}{V_y}\right)$$

Let its angle of attack along $V_{rel}$ be α. Foil movement causes drag $F_D$ and lift $F_L$ along $V_{rel}$. $F_D$ and $F_L$ contribute the horizontal thrust and drag T and D as follows:

$T=F_L*\cos(\phi)$ $D=F_D*\cos(\theta+\alpha)=F_D*\cos(90-\phi)=F_D*\sin(\phi)$

Where ch is the foil's chord length and w its width, let:

$C_L(V_{rel}, ch, \alpha)$=coefficient of lift of foil moving at $V_{rel}$ with angle of attack α

$C_D(V_{rel}, ch, \alpha)$=coefficient of drag of foil moving at $V_{rel}$ with angle of attack α

$K=0.5*\rho*ch*w*V_{rel}^2$ where ρ is water density.

By laws of fluid dynamics:

$F_L=K*C_L(V_{rel}, ch, \alpha)$ $F_D=K*C_D(V_{rel}, ch, \alpha)$

The net forward thrust fx produced by the foil is then T−D. The program code finds a hydrofoil and operating velocity, defined by w, ch, $V_x$, $V_y$, θ, that produces fx subject to the following constraints:

$$w = 1.0 \wedge \frac{f_x}{500} = 16 \wedge V_x \geq 2.0 \wedge ch \leq 3.0$$

The program code, in some embodiments of the present invention, can use the mathematical derivation above except that the coefficients of lift and drag, $C_L$ and $C_D$ can only be computed by a public-domain computational fluid dynamics simulator called xfoil. This simulator, which can be referred to as a Python program Hydrofoil(ch, $V_x$, $V_y$, θ), outputs, for example, fx/500 for a hydrofoil of unit width (w=1.0). This, the program code can use fx/500 to make the machine learning more accurate. We used Hydrofoil to generate an initial training set of just 17 points depicted in Table 1 below.

TABLE 1

| Chord | $V_x$ | $V_y$ | θ | fx/500 |
|---|---|---|---|---|
| 1.05 | 2.05 | 2.05 | 22.5 | 3.779807 |
| 0.3375 | 2.5375 | 3.5125 | 39.375 | 1.747114 |
| 0.45625 | 1.31875 | 1.31875 | 30.9375 | 0.469039 |
| 0.753125 | 2.903125 | 2.415625 | 29.53125 | 5.601161 |
| 0.426563 | 3.573438 | 1.989062 | 20.39063 | 1.424819 |
| 0.248438 | 1.014062 | 1.135937 | 44.29688 | 0.054859 |
| 1.910938 | 3.451562 | 1.623437 | 16.17188 | 21.93189 |
| 1.435938 | 0.526562 | 0.648437 | 27.42188 | 0.669086 |
| 0.842188 | 2.720313 | 1.379687 | 24.60938 | 0.634256 |
| 0.129688 | 3.207812 | 3.817187 | 30.23438 | 0.206084 |
| 0.144531 | 1.653906 | 1.836719 | 36.21094 | 0.092599 |
| 0.382031 | 3.116406 | 2.324219 | 8.085938 | 0.914766 |
| 0.500781 | 0.922656 | 0.617969 | 22.14844 | 0.17502 |
| 0.263281 | 2.385156 | 3.055469 | 27.77344 | 0.624767 |
| 1.747656 | 1.532031 | 1.714844 | 40.42969 | 10.3835 |

TABLE 1-continued

| Chord | $V_x$ | $V_y$ | θ | fx/500 |
|---|---|---|---|---|
| 1.391406 | 3.238281 | 1.958594 | 26.36719 | 6.939554 |
| 0.649219 | 3.542969 | 2.750781 | 27.07031 | 5.83429 |

The program code then applies the method of FIGS. 1-2 to solve the design problem. Based in utilizing this method, the program code generates, in this example 30 intermediate training instances to produce a solution.

ch=1.195027

$V_x$=2.992256

$V_y$=3.139126

θ=39.20471 fx/500=16

Note that the solution has to contain $$\frac{fx}{500} = 16$$

as that is part of the constraint being solved. The interesting values are those of the other four variables, constituting the hydrofoil design and operating environment, that produce this force. When the above values of ch, $V_x$, $V_y$, θ are input into Hydrofoil, it returns $$\frac{fx}{500} = 15.24586.$$

16 is within 4.94% of this value and below our error threshold of 5%.

As discussed in reference to FIGS. 1-2, various aspects of the present invention have some parameters that can change. Table 2 illustrates various aspects of the method of the present invention when utilized in the hydrofoil application.

TABLE 2

| Step # | Choice | Value |
|---|---|---|
| 0 | Problem set up | X = (ch, $V_x$, $V_y$, θ) |
| | | $Y = \left(\frac{f_x}{500}\right)$ |
| | | F = Hydrofoil |
| | | $P(X, Y) = \left(w = 1.0 \wedge \frac{f_x}{500} = 16 \wedge V_x >= 2.0 \wedge ch <= 3.0\right)$ |
| | | Obj = 0 |
| 1 | Sampling method | Sobol sequence |
| 3 | Neural network parameters | Solver = lbgfs, architecture = (4, 50, 50, 1), activation function = ReLU |
| 4 | Compression | None |
| 5 | Neural network transformation into constraint | Transformed neural network into a Mixed Integer Linear Program (MILP). The design constraint was expressed in an MILP language |
| 6 | Constraint solver used | GUROBI |
| 9 | Definition of Acc | $V_0$ within 5% of F ($U_0$) |

Table 3, below, include a complete list of training instances, 17 initial, 28 new (italics) and the final entry (underline) representing the solution is as below. In this example, the percentage error for $$\frac{fx}{500}$$

is also listed for the new instances; it shows the percentage deviation of the value computed by the MILP solver (always 16 in this case) from Hydro foil(ch, $V_x$, $V_y$, $\theta$). The values of ch, $V_x$, $V_y$, $\theta$ in the first underlined training instance were produced by solving the constraint from generalizing from the previous 17 instances. The value of $$\frac{fx}{500}$$

in this solution was 16 per P(X, Y). However, the correct value of $$\frac{fx}{500}$$

for these inputs, as determined by Hydrofoil was −0.03383. The percentage error of 16 w.r.t. this correct value is 100*|(16+0.03383)/−0.03383)|=47388.51 as shown in the last column. So, the correct value of $$\frac{fx}{500} = -0.03383$$

for these inputs was added to the training set and the procedure repeated. The procedure terminated when 16 was within 5% of the correct output, 15.24586, for the inputs in the last row.

TABLE 3

| Chord | $V_x$ | $V_y$ | $\theta$ | $\frac{fx}{500}$ | $\% \frac{fx}{500}$ Error |
|---|---|---|---|---|---|
| 1.05 | 2.05 | 2.05 | 22.5 | 3.779807 | |
| 0.3375 | 2.5375 | 3.5125 | 39.375 | 1.747114 | |
| 0.45625 | 1.31875 | 1.31875 | 30.9375 | 0.469039 | |
| 0.753125 | 2.903125 | 2.415625 | 29.53125 | 5.601161 | |
| 0.426563 | 3.573438 | 1.989062 | 20.39063 | 1.424819 | |
| 0.248438 | 1.014062 | 1.135937 | 44.29688 | 0.054859 | |
| 1.910938 | 3.451562 | 1.623437 | 16.17188 | 21.93189 | |
| 1.435938 | 0.526562 | 0.648437 | 27.42188 | 0.669086 | |
| 0.842188 | 2.720313 | 1.379687 | 24.60938 | 0.634256 | |
| 0.129688 | 3.207812 | 3.817187 | 30.23438 | 0.206084 | |
| 0.144531 | 1.653906 | 1.836719 | 36.21094 | 0.092599 | |
| 0.382031 | 3.116406 | 2.324219 | 8.085938 | 0.914766 | |
| 0.500781 | 0.922656 | 0.617969 | 22.14844 | 0.17502 | |
| 0.263281 | 2.385156 | 3.055469 | 27.77344 | 0.624767 | |
| 1.747656 | 1.532031 | 1.714844 | 40.42969 | 10.3835 | |
| 1.391406 | 3.238281 | 1.958594 | 26.36719 | 6.939554 | |
| 0.649219 | 3.542969 | 2.750781 | 27.07031 | 5.83429 | |
| 0.511539 | 1.746255 | 0.213259 | 10.05396 | −0.03383 | 47388.52 |
| 1.344887 | 1.933144 | 0.25561 | 7.344228 | −0.01096 | 146067.2 |
| 1.910938 | 3.573438 | 3.5125 | 43.44657 | 6.965998 | 129.6871 |
| 0.931986 | 2.033668 | 1.009029 | 10.46591 | 1.395399 | 1046.626 |
| 0.515684 | 1.892454 | 1.230148 | 1.064888 | 0.147059 | 10779.96 |
| 1.985832 | 3.453791 | 0.571471 | 15.03801 | −4.91157 | 425.7612 |
| 1.677068 | 2.714192 | 1.283137 | 26.48237 | −1.41998 | 1226.773 |
| 1.77671 | 3.40017 | 2.070607 | 26.5462 | 12.48189 | 28.18572 |
| 1.599351 | 3.573438 | 1.886783 | 22.32144 | 11.03638 | 44.9751 |
| 0.428714 | 2.240315 | 2.841859 | 30.38441 | 1.251002 | 1178.975 |
| 0.811936 | 1.81195 | 2.082863 | 35.05207 | 2.618155 | 511.1174 |
| 0.153152 | 0.99546 | 0.791124 | 26.34229 | 0.014413 | 110910.5 |
| 1.735917 | 3.213912 | 3.20868 | 36.75804 | 38.94127 | 58.91249 |
| 1.20362 | 2.459875 | 3.038336 | 44.29688 | 12.5504 | 27.48594 |
| 1.447529 | 3.378407 | 1.646132 | 15.66069 | 14.62628 | 9.392103 |
| 0.308028 | 2.536728 | 1.443249 | 3.22124 | 0.070886 | 22471.3 |
| 0.403288 | 2.156784 | 0.755765 | 12.35386 | 0.221516 | 7122.947 |
| 0.306647 | 3.609292 | 2.089452 | 9.488186 | 0.179645 | 8806.454 |
| 1.250732 | 3.286455 | 0.181191 | 0.902117 | 0.129667 | 12239.32 |
| 1.388534 | 2.224338 | 0.960339 | 43.90419 | −6.25047 | 355.9807 |
| 1.514422 | 2.899915 | 2.740333 | 40.00657 | 8.498973 | 88.25804 |
| 1.615841 | 2.114738 | 0.970464 | 29.21794 | −2.95164 | 642.0722 |
| 0.850306 | 2.345799 | 1.352859 | 28.42956 | 0.363401 | 4302.844 |
| 1.131663 | 2.822165 | 3.062189 | 39.45431 | 14.14895 | 13.08262 |
| 0.490947 | 2.729197 | 1.788505 | 8.815927 | 0.369315 | 4232.346 |
| 0.298406 | 2.697234 | 1.254683 | 22.54102 | 0.088563 | 17966.19 |
| 0.298122 | 0.252637 | 0.385454 | 38.99096 | 0.006576 | 243198.7 |
| 1.375004 | 2.775292 | 3.275891 | 44.29688 | 14.99426 | 6.707534 |
| *1.195027* | *2.992256* | *3.139126* | *39.20471* | *15.24586* | *4.946496* |

As discussed above, embodiments of the present invention can be generalized to accommodate method to multiple functions. Sometimes a CPS cannot be modeled as a single function, but instead as a collection of functions in which inputs of some functions are outputs of others. These functions could represent CPS components or subsystems. A single evaluator for the whole CPS may not even be available.

In embodiments of the present invention, the method is generalized (aspects of some embodiments of the present invention) to the multiple function case. The plan from the single function case remains the same (e.g., FIGS. 1-2): learn the function via machine learning, convert it into an equivalent constraint, solve it, and if the solution is unacceptable, use the solution to derive a correct mapping between inputs and outputs, add it to the training set and retry. A benefit of utilizing embodiments of the present invention in this manner is that neural networks can be composed by Boolean conjunction of their equivalent constraint representations. Thus, the program code (e.g., FIG. 2, NN Learning Engine 230) can learn each of the functions separately as neural networks, convert them into constraints (e.g., FIG. 2, NN-LP Converter 250)), and solve their conjunction. Furthermore, if program code determines that the solution is unacceptable (e.g., FIG. 2 LP Solver 260), the program code can utilize the solution to generate new training instances for each of the functions and retry (e.g., FIG. 2 Learning from Failure System 205).

Figure 4:
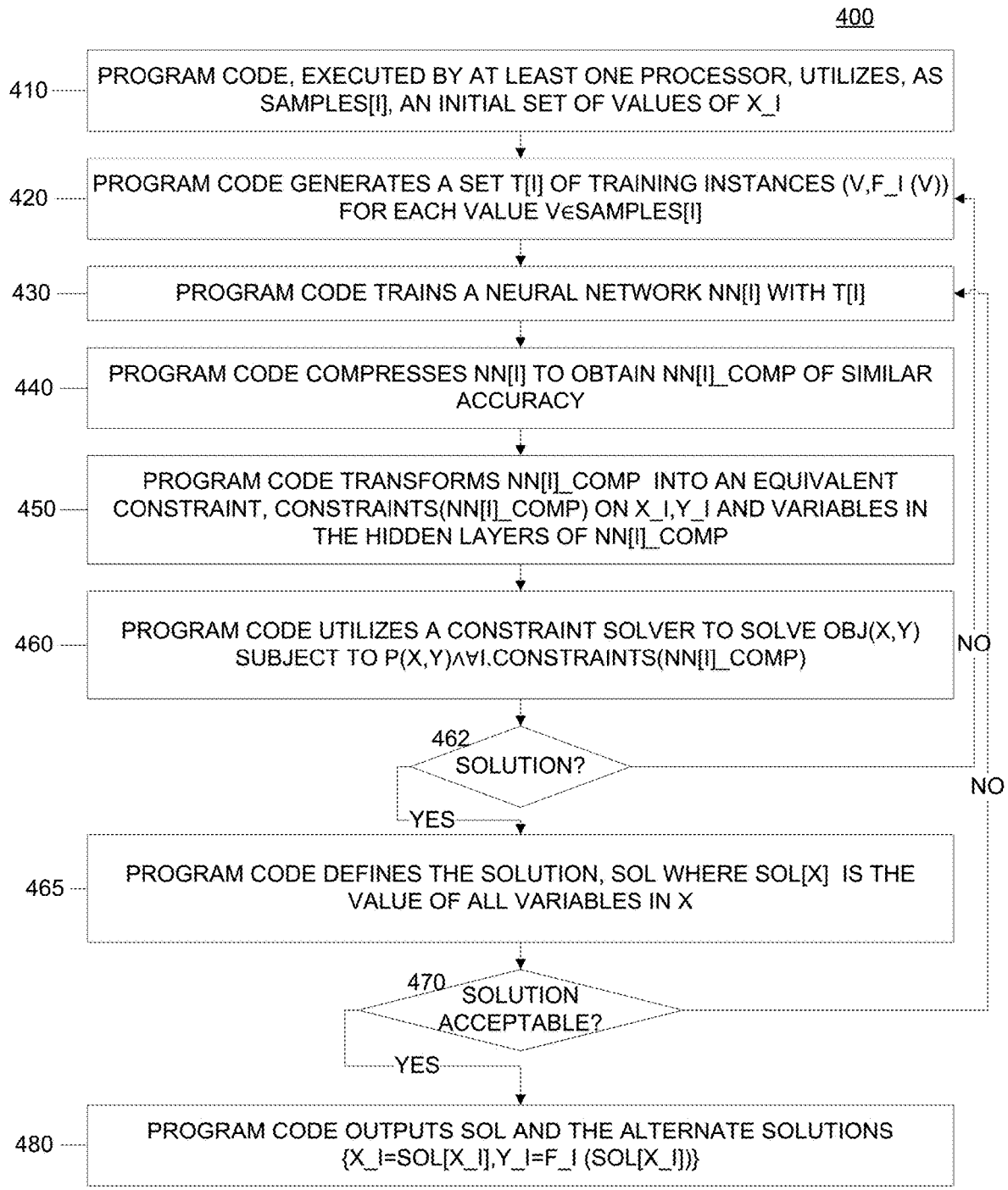
FIG. 4 is a workflow that illustrates various aspects of some embodiments of the present invention.

FIG. 4 illustrates certain aspects of some embodiments of the present invention by precisely defining a plan utilized by the program code in embodiments of the present invention in a non-limiting manner. In this example, the program code models CPS by functions $F_i(X_i)=Y_i$ for $i \in \{1 \ldots k\}$ where $X_i$ and $Y_i$ are vectors of discrete or continuous variables. Let $X=\text{concat}(X_1, \ldots, X_k)$ and $Y=\text{concat}(Y1, \ldots, Y_k)$. Let $P(X, Y)$ be a predicate or condition and $\text{Obj}(X, Y)$ an objective function. The goal of this example is to find values of X and Y that optimize Obj subject to $P(X, Y) \wedge \forall i_{i=1}^k. F(X_i)=Y_i$. For the purposes of this example, the program code utilizes simulations to evaluate $F_1, \ldots, F_k$. Also, none of the $X_i$, $Y_i$ have any variables in common. The program code utilizes the constraint x=y to model the fact that x and y are the same variable.

Referring to FIG. 4, in an embodiment of the present invention, for each i, the program code, executed by at least one processor, utilizes, as Samples[i], an initial set of values of $X_i$ (410). For each i, the program code generates a set T[i] of training instances $(V, F_i(V))$ for each value $V \in$ Samples[i] (420). For each i, the program code trains a neural network NN[i] with T[i] (430). For each i, the program code compresses NN[i] to obtain NN[i]$_{comp}$ of similar accuracy (440). For each i, the program code transforms NN[i]$_{comp}$ into an equivalent constraint, Constraints(NN[i]$_{comp}$) on $X_i$, $Y_i$ and variables in the hidden layers of NN[i]$_{comp}$ (450). The program code utilizes a constraint solver to optimize Obj(X, Y) subject to $P(X, Y) \wedge \forall i$. Constraints(NN[i]$_{comp}$) (460). If no solution is found (462), for each i, sample additional values $X_i$, add them to Samples[i], and generates training instances (420). If a solution is found (462), the program code defines the solution, Sol where Sol[X] is the value of all variables in X (465). The program code determines if Sol is acceptable w.r.t. $F_1, \ldots, F_k$, P, Obj, abbreviated Acc$_{all}$(Sol, $(F_1, \ldots, F_k)$, P, Obj) (470). Based on the program code determining that the solution is acceptable, the program code outputs Sol and the alternate solutions $\{X_i=\text{Sol}[X_i]$, $Y_i=F_i(\text{Sol}[X_i])\}$(480). Based on the program code determining that the solution is not acceptable, the program code, for each i, lets $T[i]=T[i] \cup \{(\text{Sol}[X_i], F_i(\text{Sol}[X_i]))\}$ and utilizes these values to train the neural network (430). In some embodiments of the present invention, the program code adds additional training instances $(X_i, F_i(X_i))$ to $T_i$ for values of $X_i$ selected by a sampling method. A definition of Acc$_{all}$ (Sol, $(F_1, \ldots, F_k)$, P, Obj) is as follows: For each i, Sol[$Y_i$] is close enough to $F_i(\text{Sol}[X_i])$. Another definition may be that $P(\text{Sol}[X], (F_1(\text{Sol}[X_1]), \ldots, F_k(\text{Sol}[X_k])))$.

Embodiments of the present invention can be utilized to design a composite CPS consisting of a boat powered by a hydrofoil, integrating aspects of various embodiments of the present invention into a practical application. Two functions in the CPS described in Table 4 below.

TABLE 4

| Function | X | Y |
|---|---|---|
| Hydrofoil | ch, VGlider$_x$, VGlider$_y$, θ | fGlider$_x$ / 500 |
| Boat | length, beam, draft, ampl, period, fBoat$_x$ | VBoat$_x$, VBoat$_y$ |

Embodiments of the present invention can be utilized to design a composite CPS consisting of a boat powered by a hydrofoil, integrating aspects of various embodiments of the present invention into a practical application. Two functions in the CPS are described in Table 4 below. The first function models the hydrofoil, for w=1, as before. The second function models the boat. Given a boat with length, beam, draft floating on a wave with amplitude ampl and period period on which a forward force fBoat$_x$ is being applied, the function computes the boat's steady state velocity (VBoat$_x$, VBoat$_y$) taking into account the drag force on the boat. The function uses numerical methods.

In this example, aspects of some embodiments of the present invention can be utilized to find values of X and Y for an equilibrium: the forward force acting on the glider is equal to that generated by the hydrofoil and the boat and glider move at identical velocities. Note that variable dependencies are circular: velocities are inputs to Hydrofoil but outputs of Boat, while the force is an input to Boat and the output of Hydrofoil. Our method handles such dependencies because the underlying constraint solver does not make any distinction between input and output variables. Additional constraints specify the width of the hydrofoil, lower bounds on the forward velocity and the current wave condition. More precisely, the definition of P(X, Y) is:

$$\text{VBoat}_x=\text{VGlider}_x \wedge$$

$$\text{VBoat}_y=\text{VGlider}_y \wedge$$

$$\text{fBoat}_x=0.3*500*\text{fGlider}_x \wedge$$

$$\text{VBoat}_x \geq 1 \wedge$$

$$\text{ampl}==6 \wedge$$

$$\text{period}=8.45$$

Program code cycles through the processes outlined in FIGS. 1-2 and, in this example, results of the method are displayed in Table 5 below. The program code utilized an initial set of 17 training instances. As a results of performing aspects of the present invention, the program code generates an additional 15 instances (underlined) are generated. The final entry (italics) in Table 5 represents the solution, as generated by the program code

TABLE 5

| ch | $V_x$ | $V_y$ | θ | $\frac{fx}{500}$ | % $\frac{fx}{500}$ error |
|---|---|---|---|---|---|
| 1.05 | 2.05 | 2.05 | 22.5 | 3.779807 | |
| 0.3375 | 2.5375 | 3.5125 | 39.375 | 1.747114 | |
| 0.45625 | 1.31875 | 1.31875 | 30.9375 | 0.469039 | |
| 0.753125 | 2.903125 | 2.415625 | 29.53125 | 5.601161 | |
| 0.426563 | 3.573438 | 1.989062 | 20.39063 | 1.424819 | |
| 0.248438 | 1.014062 | 1.135937 | 44.29688 | 0.054859 | |
| 1.910938 | 3.451562 | 1.623437 | 16.17188 | 21.93189 | |
| 1.435938 | 0.526562 | 0.648437 | 27.42188 | 0.669086 | |
| 0.842188 | 2.720313 | 1.379687 | 24.60938 | 0.634256 | |
| 0.129688 | 3.207812 | 3.817187 | 30.23438 | 0.206084 | |
| 0.144531 | 1.653906 | 1.836719 | 36.21094 | 0.092599 | |
| 0.382031 | 3.116406 | 2.324219 | 8.085938 | 0.914766 | |
| 0.500781 | 0.922656 | 0.617969 | 22.14844 | 0.17502 | |
| 0.263281 | 2.385156 | 3.055469 | 27.77344 | 0.624767 | |
| 1.747656 | 1.532031 | 1.714844 | 40.42969 | 10.3835 | |
| 1.391406 | 3.238281 | 1.958594 | 26.36719 | 6.939554 | |
| 0.649219 | 3.542969 | 2.750781 | 27.07031 | 5.83429 | |
| 0.511539 | 1.746255 | 0.213259 | 10.05396 | −0.03383 | 1838.340813 |
| 0.434641 | 1.499616 | 2.67727 | 31.42006 | 1.455963 | 35.76321873 |
| 0.931986 | 2.033668 | 1.009029 | 10.46591 | 1.395399 | 57.06303974 |
| 0.515684 | 1.892454 | 1.230148 | 1.064888 | 0.147059 | 54.66681915 |
| 1.985832 | 3.453791 | 0.571471 | 15.03801 | −4.91157 | 119.0828781 |
| 1.677068 | 2.714192 | 1.283137 | 26.48237 | −1.41998 | 112.9969444 |
| 0.321619 | 1.58086 | 2.696016 | 30.58937 | 0.817736 | 8.956381866 |
| 1.77671 | 3.40017 | 2.070607 | 26.5462 | 12.48189 | 96.96149763 |
| 0.428714 | 2.240315 | 2.841859 | 30.38441 | 1.251002 | 23.33811738 |
| 0.811936 | 1.81195 | 2.082863 | 35.05207 | 2.618155 | 97.01456755 |
| 0.153152 | 0.99546 | 0.791124 | 26.34229 | 0.014413 | 4912.294397 |
| 1.735917 | 3.213912 | 3.20868 | 36.75804 | 38.94127 | 98.92949601 |
| 0.308028 | 2.536728 | 1.443249 | 3.22124 | 0.070886 | 1395.373282 |
| 0.403288 | 2.156784 | 0.755765 | 12.35386 | 0.221516 | 555.7274639 |
| 0.331997 | 2.215119 | 2.855315 | 30.23407 | 0.784282 | 2.02790556 |

Table 6 is an example of a table the boat is below with 50 initial training instances, 15 new ones, and a final answer, the training instances and the final answer generated by the program code in accordance with the method illustrated in FIGS. 1-2, and 4.

TABLE 6

| length | beam | draft | ampl | period | fx | VBoat$_x$ | VBoat$_y$ | % V Boat$_x$ Error | % V Boat$_y$ Error |
|---|---|---|---|---|---|---|---|---|---|
| 1.15 | 0.35 | 0.35 | 5.315 | 7.8 | 130 | 1.32 | 2.7256 | | |
| 1.575 | 0.275 | 0.425 | 2.823 | 10.1 | 70 | 0.85 | 1.1178 | | |
| 0.725 | 0.425 | 0.275 | 7.808 | 5.5 | 190 | 2.02 | 5.6782 | | |
| 0.9375 | 0.3125 | 0.3875 | 1.576 | 11.25 | 220 | 1.91 | 0.5604 | | |
| 1.7875 | 0.4625 | 0.2375 | 6.561 | 6.65 | 100 | 0.95 | 3.9466 | | |
| 1.3625 | 0.2375 | 0.3125 | 4.069 | 4.35 | 160 | 1.52 | 3.7414 | | |
| 0.5125 | 0.3875 | 0.4625 | 9.054 | 8.95 | 40 | 1 | 4.0464 | | |
| 0.61875 | 0.2937 | 0.2937 | 7.184 | 8.375 | 55 | 1.28 | 3.4313 | | |
| 1.46875 | 0.4438 | 0.4438 | 2.199 | 3.775 | 175 | 1.21 | 2.3305 | | |
| 1.89375 | 0.2187 | 0.3687 | 9.677 | 6.075 | 115 | 1.07 | 6.3716 | | |
| 1.04375 | 0.3687 | 0.2187 | 4.692 | 10.675 | 235 | 2.04 | 1.7581 | | |
| 0.83125 | 0.2563 | 0.4812 | 5.938 | 7.225 | 205 | 1.9 | 3.2875 | | |
| 1.68125 | 0.4063 | 0.3313 | 0.953 | 11.825 | 85 | 0.88 | 0.3224 | | |
| 1.25625 | 0.3313 | 0.2563 | 8.431 | 9.525 | 145 | 1.46 | 3.5404 | | |
| 0.40625 | 0.4812 | 0.4063 | 3.446 | 4.925 | 25 | 0.87 | 2.7985 | | |
| 0.459375 | 0.3406 | 0.4531 | 4.38 | 5.7875 | 93 | 1.66 | 3.0274 | | |
| 1.309375 | 0.4906 | 0.3031 | 9.365 | 10.388 | 213 | 1.49 | 3.6064 | | |
| 1.734375 | 0.2656 | 0.2281 | 1.888 | 8.0875 | 33 | 0.66 | 0.9337 | | |
| 0.884375 | 0.4156 | 0.3781 | 6.873 | 3.4875 | 153 | 1.54 | 7.8828 | | |
| 1.096875 | 0.2281 | 0.3406 | 3.134 | 9.2375 | 183 | 1.78 | 1.3571 | | |
| 1.946875 | 0.3781 | 0.4906 | 8.119 | 4.6375 | 63 | 0.66 | 7.003 | | |
| 1.521875 | 0.3031 | 0.4156 | 0.642 | 6.9375 | 243 | 1.55 | 0.3699 | | |
| 0.671875 | 0.4531 | 0.2656 | 5.627 | 11.538 | 123 | 1.66 | 1.9507 | | |
| 0.565625 | 0.2469 | 0.3594 | 8.742 | 10.963 | 108 | 1.84 | 3.1899 | | |
| 1.415625 | 0.3969 | 0.2094 | 3.757 | 6.3625 | 228 | 1.7 | 2.3621 | | |
| 1.840625 | 0.3219 | 0.2844 | 6.25 | 4.0625 | 48 | 0.7 | 6.1535 | | |
| 0.990625 | 0.4719 | 0.4344 | 1.265 | 8.6625 | 168 | 1.42 | 0.584 | | |
| 0.778125 | 0.2844 | 0.2469 | 9.988 | 5.2125 | 138 | 1.9 | 7.665 | | |
| 1.628125 | 0.4344 | 0.3969 | 5.003 | 9.8125 | 18 | 0.39 | 2.0396 | | |

TABLE 6-continued

| length | beam | draft | ampl | period | fx | VBoat$_x$ | VBoat$_y$ | % V Boat$_x$ Error | % V Boat$_y$ Error |
|---|---|---|---|---|---|---|---|---|---|
| 1.203125 | 0.2094 | 0.4719 | 7.496 | 12.113 | 198 | 1.62 | 2.4754 | | |
| 0.353125 | 0.3594 | 0.3219 | 2.511 | 7.5125 | 78 | 1.87 | 1.3369 | | |
| 0.379687 | 0.2797 | 0.3828 | 6.094 | 9.6688 | 164 | 2.66 | 2.5211 | | |
| 1.229687 | 0.4297 | 0.2328 | 1.109 | 5.0688 | 44 | 0.78 | 0.8751 | | |
| 1.654687 | 0.2047 | 0.3078 | 8.586 | 7.3688 | 224 | 1.69 | 4.661 | | |
| 0.804688 | 0.3547 | 0.4578 | 3.601 | 11.969 | 104 | 1.31 | 1.2036 | | |
| 1.017188 | 0.2422 | 0.2703 | 7.34 | 6.2188 | 74 | 1.24 | 4.7213 | | |
| 1.867188 | 0.3922 | 0.4203 | 2.355 | 10.819 | 194 | 1.18 | 0.8708 | | |
| 1.442188 | 0.3172 | 0.4953 | 9.833 | 8.5188 | 14 | 0.37 | 4.6169 | | |
| 0.592188 | 0.4672 | 0.3453 | 4.848 | 3.9188 | 134 | 1.74 | 4.9482 | | |
| 0.698437 | 0.2234 | 0.4391 | 1.732 | 4.4938 | 149 | 1.87 | 1.5417 | | |
| 1.548438 | 0.3734 | 0.2891 | 6.717 | 9.0938 | 29 | 0.57 | 2.9546 | | |
| 1.973437 | 0.2984 | 0.2141 | 4.225 | 11.394 | 209 | 1.5 | 1.4831 | | |
| 1.123437 | 0.4484 | 0.3641 | 9.21 | 6.7938 | 89 | 1.03 | 5.4224 | | |
| 0.910938 | 0.3359 | 0.3266 | 0.486 | 10.244 | 119 | 1.46 | 0.1897 | | |
| 1.760937 | 0.4859 | 0.4766 | 5.471 | 5.6438 | 239 | 1.24 | 3.8774 | | |
| 1.335938 | 0.2609 | 0.4016 | 2.978 | 3.3438 | 59 | 0.86 | 3.5628 | | |
| 0.485937 | 0.4109 | 0.2516 | 7.963 | 7.9438 | 179 | 2.45 | 4.0098 | | |
| 0.432812 | 0.2703 | 0.2797 | 10.14 | 12.256 | 246 | 3.35 | 3.3107 | | |
| 1.282813 | 0.4203 | 0.4297 | 5.159 | 7.6563 | 126 | 1.12 | 2.6954 | | |
| 1.707812 | 0.3453 | 0.3547 | 7.652 | 5.3563 | 186 | 1.3 | 5.7142 | | |
| 1.07405 | 0.319 | 0.4658 | 6 | 8.45 | 88 | 1.07 | 2.8402 | 4.85828 | 0.215476 |
| 1.282201 | 0.2597 | 0.2383 | 6 | 8.45 | 140 | 1.54 | 2.8402 | 2.858991 | 5.737779 |
| 0.442089 | 0.4146 | 0.4957 | 6 | 8.45 | 90 | 1.56 | 2.8402 | 9.165573 | 5.210692 |
| 0.470327 | 0.2 | 0.4349 | 6 | 8.45 | 10 | 0.6 | 2.8402 | 65.89497 | 3.269605 |
| 0.582468 | 0.3552 | 0.4687 | 6 | 8.45 | 141 | 1.78 | 2.8402 | 5.445483 | 2.235734 |
| 0.512685 | 0.3152 | 0.3213 | 6 | 8.45 | 28 | 0.96 | 2.8402 | 4.240073 | 0.519838 |
| 0.963498 | 0.3367 | 0.2 | 6 | 8.45 | 112 | 1.53 | 2.8402 | 3.279023 | 5.077765 |
| 0.94821 | 0.3291 | 0.2948 | 6 | 8.45 | 57 | 1.02 | 2.8402 | 2.095133 | 1.580727 |
| 1.229877 | 0.2 | 0.4014 | 6 | 8.45 | 144 | 1.45 | 2.8402 | 4.389065 | 5.828205 |
| 0.495175 | 0.3742 | 0.2072 | 6 | 8.45 | 12 | 0.66 | 2.8402 | 50.43828 | 2.882755 |
| 1.082516 | 0.3155 | 0.336 | 6 | 8.45 | 108 | 1.29 | 2.8402 | 1.182272 | 2.33451 |
| 0.981474 | 0.2 | 0.2998 | 6 | 8.45 | 63 | 1.18 | 2.8402 | 7.414683 | 3.949607 |
| 1.02789 | 0.4287 | 0.3737 | 6 | 8.45 | 159 | 1.45 | 2.8402 | 5.765659 | 2.273719 |
| 1.235248 | 0.3308 | 0.3319 | 6 | 8.45 | 218 | 1.7 | 2.8402 | 7.519845 | 0.413745 |
| 0.448063 | 0.2681 | 0.2954 | 6 | 8.45 | 120 | 2.2709 | 2.8402 | 2.457538 | 0.530881 |

Embodiments of the present invention can accurately learn the (entire) design space of the combined boat and glider model by initially sampling the design space more finely. The examples provided herein, including this example, provide benchmarks to illustrate the efficiency savings in embodiments of the present that provide an advantage over existing approaches. In this example, to generate the sample data set, each input variable of the boat function was discretized into 8 evenly spaced values by the program code. Thus, the program code generated 262,144 training instances for the boat. The glider data was generated similarly and had 263,389 training instances. Even with this much data, a query with the constraintP(X, Y), as noted below, will not yield acceptable results: the a query with the constraintP(X, Y):

VBoat$_x$=VGlider$_x$∧

VBoat$_y$=VGlider$_y$∧ fBoat$_x$=0.3*500*fGlider$_x$∧

VBoat$_x$=1

In this example, while the boat outputs were under 5%, the glider error was 13.16%. These results suggests that more data would achieve higher levels of accuracy. However, generating lots of data is time expensive. Thus, starting with a much smaller data set and only generating more data in the relevant design space can help decrease the time spent generating data. The use of fewer data sets, as provided in the tables above, illustrates an advantage of utilizing aspects of embodiments of the present invention.

As discussed with reference to at least FIG. 2, compressing a neural network can be understood as an optional aspect of embodiments of the present invention. However, utilizing this aspect does provide certain benefits. An example of a wave glider can be utilized to illustrate these benefits. For example, to illustrate the benefits of compressing the neural network(s) the wave glider can be modeled t with the assumption that the lift and draft coefficients are constants, independent of vrel, ch, and α. This assumption enables reduction of the model to an equation that can easily be evaluated using by the program code in some embodiments of the present invention. Table 7 provides details of this illustrative and non-limiting example.

TABLE 7

| Function | X | Y |
|---|---|---|
| $v_x = \sqrt{\dfrac{k}{c_L}}$ | ρ, $C_D$, $C_L$, ch, w, ampl, period | $v_x$ |

$$k = \frac{1}{2}\rho C_D * ch * w * (2 * ampl * \pi/period)^2 * 0.3$$

Figure 5:
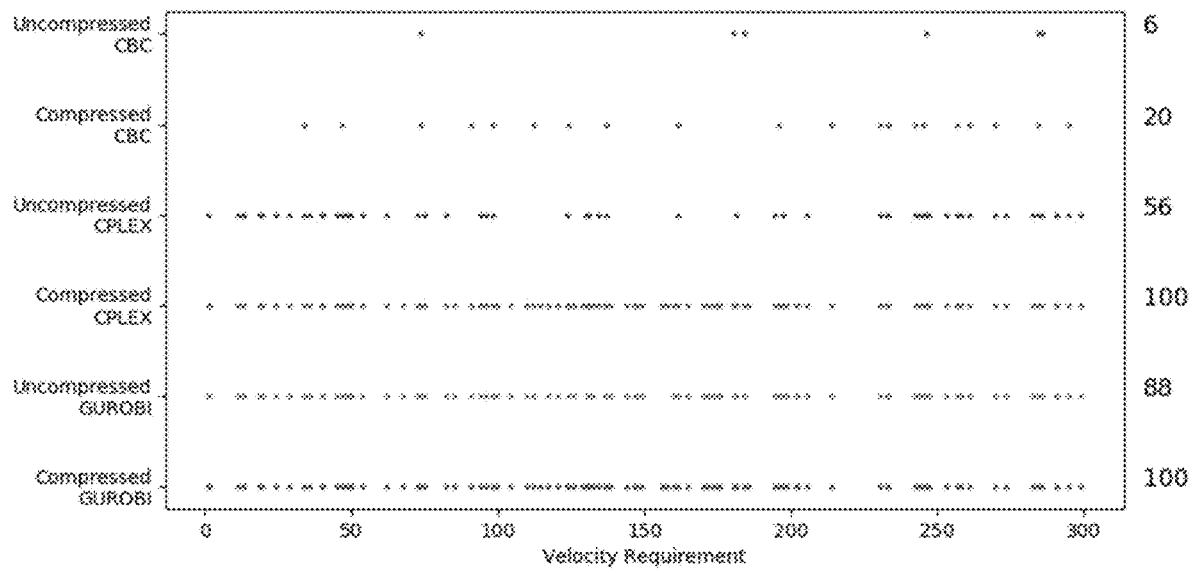
FIG. 5 illustrates various advantages of utilizing aspects of some embodiments of the present invention.
Figure 6:
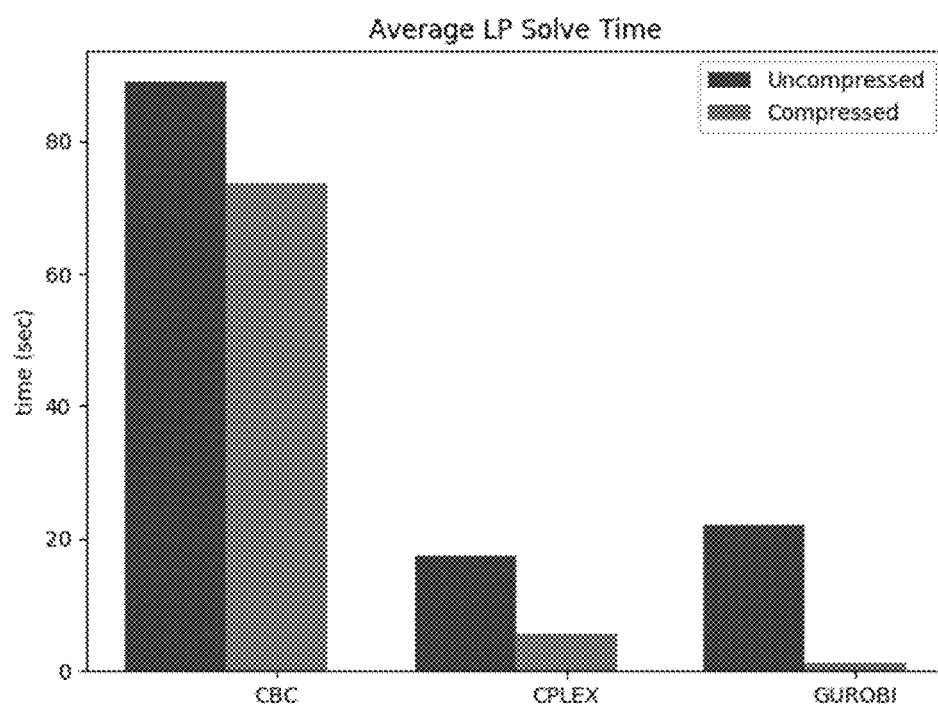
FIG. 6 illustrates various advantages of utilizing aspects of some embodiments of the present invention.

In this example, program code executed by at least one processor performs various aspects depicted in FIG. 2. Referring back to FIG. 2, program code, executed by one or more processors, finds values of X and Y that optimize Obj subject to P(X, Y)∧F(X)=Y. The program code utilizes a simulator to evaluate F. Z is the tuple of variables $(z_0, \ldots, z_k)$. Let Z=$(v_0, \ldots, v_k)$ mean that for each i, the constant $v_i$ is a value of $z_i$. In an embodiment of the present invention, the program code of the sampling engine 210 sets Samples be a set of values of X. The program code of an evaluator 220 creates the set T of training instances (V, F(V)) for each design point V∈ Samples with a learning engine 230 that is a NN. The program code trains a machine learning algorithm/neural network NN with T. The program code selects various parameters for training the neural network. Program code of a compression engine 240 compresses NN to obtain $NN_{comp}$ of similar accuracy. In this example, both the NN and the $NN_{comp}$ were obtained by the program code and the MILP representation and ran 100 inversion queries. For each query the program code requested that the MILP solver find a design that would produce a $v_x$ equal to a randomly generated value. The program code ran the solver, in this non-limiting example offered for illustrative purposes only, for a maximum of 5 minutes per each query. As aforementioned, the program code can utilize various solvers, and in this example, the program code utilized the following three different solvers: CBC, CPLEX and GUROBI. To illustrate the functionality of certain aspects of the invention, in a chart which is provided as FIG. 5 for every query that was solved by the program code, and the numbers on the right in the chart represent the total number of queries (out of 100) that were solved. Based on the results, as documented in FIG. 5, for each solver, using the compressed neural network helped solve more queries within the time limit. FIG. 6 depicts an average time in this example that it took the program code to solve the queries that came back within 5 minutes. As illustrated in FIG. 6, compressing the neural network decreases LP solve times.

Embodiments of the present invention can by utilized to synthesize logical CPS, e.g., control maneuvers. The program code models a maneuver as a configurable plan. The resultant application of an embodiment of the present invention is a maneuver that, if performed, with the configuration determined by the program code, for an appropriate amount of time (e.g., an amount of time determined by the program code), would preserve the safety of the driver. Utilizing the model in embodiments of the present invention, the program code can express the answer as a program or simulator F(X)=Y where X is the plan configuration and Y=true/false. Thus, the program code in embodiments of the present invention generates X:F(X)=Y∧Y=true. Two examples of practical applications of embodiments of the present invention to synthesize logical CPS, e.g., control maneuvers include: 1) finding parameters of sigmoid curve for safe parallel parking with moving obstacles; and 2) robot path planning.

Figures 7, 8:
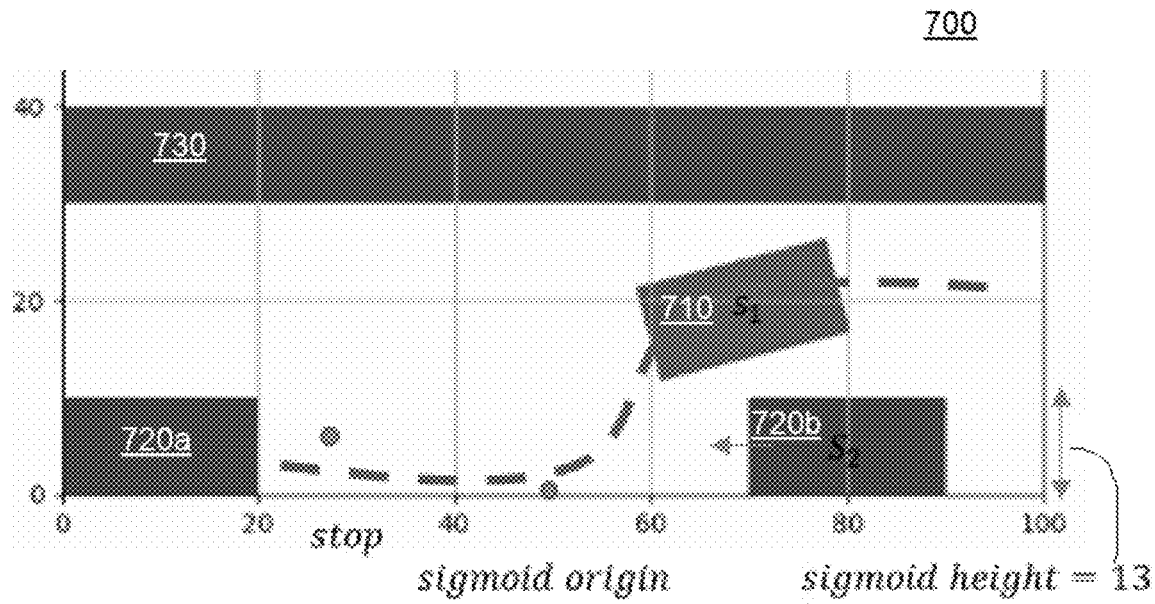
FIG. 7 illustrates an integration of some embodiments of the present invention into a practical application.
FIG. 8 illustrates an integration of some embodiments of the present invention into a practical application.

FIGS. 7-8 illustrate the parallel parking application of aspects of some embodiments of the present invention. Program code in embodiments of the present invention determines a path to avoiding multiple obstacles while parallel parking. As illustrated in FIG. 7, in this example 700, program code in embodiments of the present invention is utilized to find values of $s_1$, $s_2$, damp, stop, with certain specifics for the first car 710. As depicted in FIG. 7, the first car 710 starts at (100, 13). The first car 710 moves at speed $s_1$ along a sigmoid $$y(x) = \frac{13}{1 + e^{-damp*x}}$$

with origin (50, 0). The first car 710 stops at (stop, 5) where the derivative of the curve is close to 0, so the first car 710 is straightened. A successful maneuver means that the first car 710 never collides with the second car 720b, on the right, starting at (100, 5) moving at speed $s_2$. A successful maneuver also means that the first car 710 would never collide with the road divider 730 at top. Additionally, the first car 710 should never collide with the third car 720a, the car at the left. To determined a successful maneuver, applying an embodiment of the present invention, the program code utilizes safe($s_1$, $s_2$, damp, stop), which returns true/false depending on whether the above conditions are satisfied, during a long enough period of time. The program code then determines $s_1$, $s_2$, damp, stop, such that safe($s_1$, $s_2$, damp, stop). In practice, in one example, in 221K possible training instances, the program code in an embodiment of the present invention generated 110 training sequences to solve this query in a few seconds. FIG. 8 provides a further illustration of this example.

Figure 9:
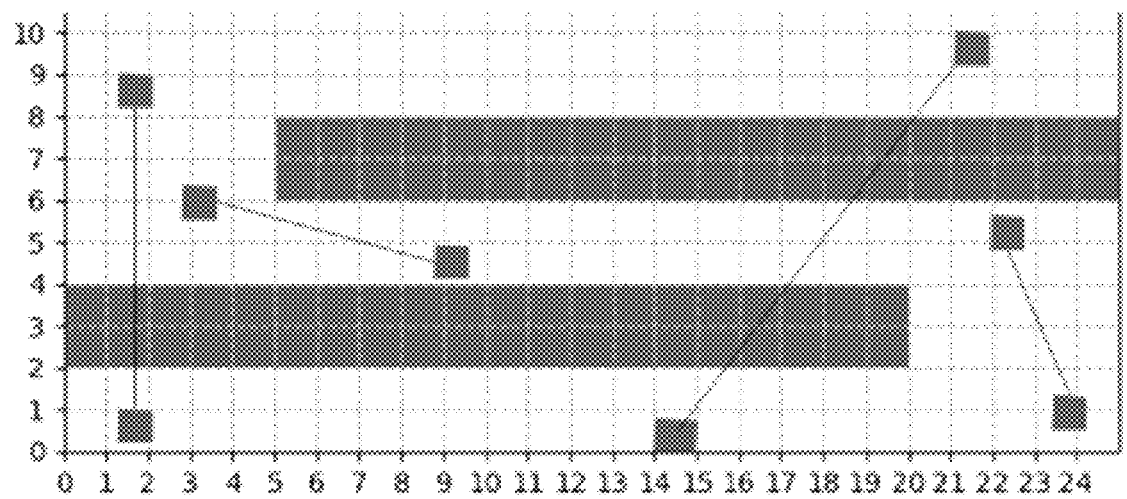
FIG. 9 illustrates an integration of certain aspects of some embodiments of the present invention into a practical application.

FIG. 9 is an illustration 900 of an application of an embodiment of the present invention to robot path planning. In this example, parameters provided to the program code include a set of obstacles, a robot of a given shape, an initial position ($x_0$, $y_0$) and a final position ($x_k$, $y_k$). The program code determined a safe (collision-free) path ($x_0$, $y_0$), . . . , ($x_k$, $y_k$). To this end, the program code encodes the predicate safePath($x_0$, $y_0$, . . . , $x_k$, $y_k$) as a function that would return true/false depending on whether the trajectory is safe for the given set of obstacles, and then the program code computes the path to find $x_0$, $y_0$, . . . , $x_k$, $y_k$ such that safePath($x_0$, $y_0$, . . . , $x_k$, $y_k$). In this example, the feature space is of size 2*k and for a 100×100 grid the total number of combinations with a discrete step of size 10 would be $10^{2*k}$. The program code can cut down this space by learning just safe($x_0$, $y_0$, $x_1$, $y_1$) to mean that the robot can go from $x_0$, $y_0$ to $x_1$, $y_1$ without colliding, as illustrated in FIG. 9. Then, the program code finds a path of length k by solving the following:

safe($x_0$, $y_0$, $x_1$, $y_1$)∧
safe($x_1$, $y_1$, $x_2$, $y_2$)∧ . . . ∧
safe($x_{k-1}$, $y_{k-1}$, $x_k$, $y_k$)

Figure 10:
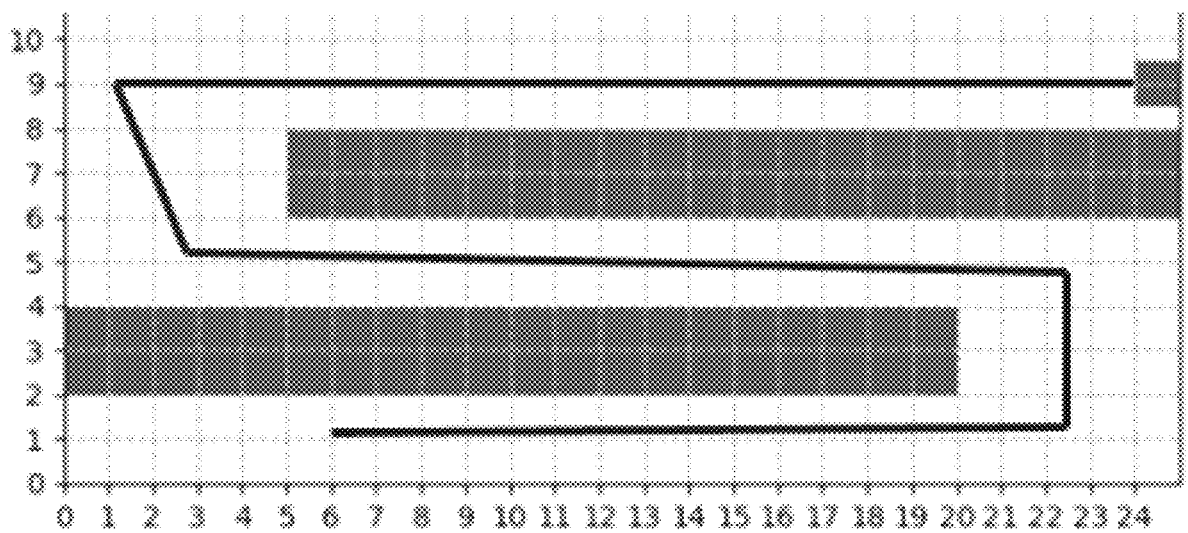
FIG. 10 illustrates an integration of some embodiments of the present invention into a practical application.

For example, if ($x_0$, $y_0$)=(24,9) and ($x_k$, $y_k$)=(6,1) for k=5, the program code computes the path as shown. In this example, the program code utilizes the neural network architecture of (4, 8, 8, 8, 1). Out of a total of 62.5K training instances for a 25×10 grid, the program code only needed to generate 250 and solved the query in a few seconds. FIG. 10 illustrates a solution determined by the program code in an embodiment of the present invention for this path.

Figure 11:
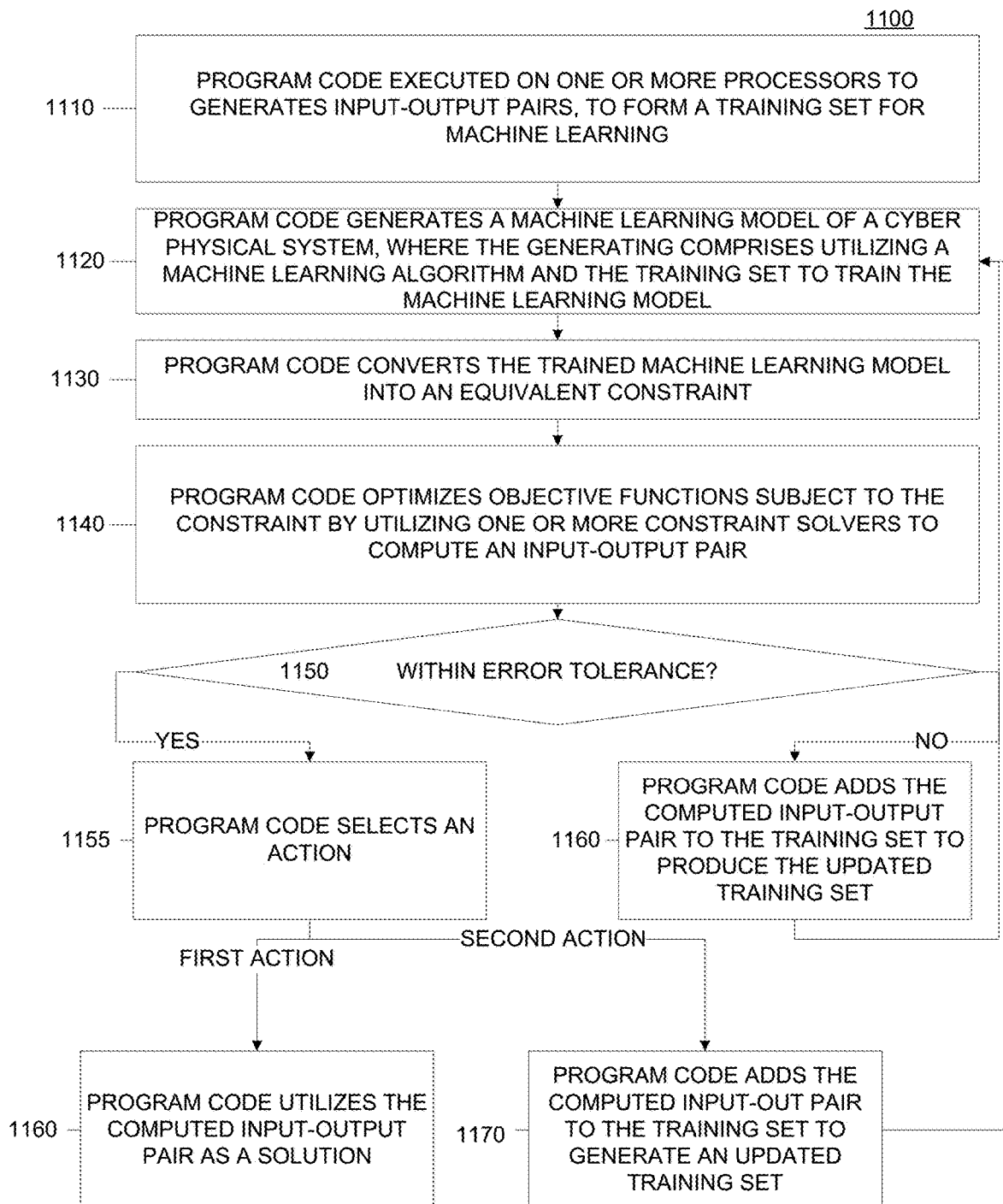
FIG. 11 is a workflow that illustrates various aspects of some embodiments of the present invention.

FIG. 11 is a workflow 1110 that illustrates various aspects of some embodiments of the present invention. As depicted in FIG. 11, in some embodiments of the present invention, program code executed on one or more processors to generates input-output pairs, to form a training set for machine learning (1110). The program code generates a machine learning model of a cyber physical system, where the generating comprises utilizing a machine learning algorithm and the training set to train the machine learning model (1120). The program code converts the trained machine learning model into an equivalent constraint (1130). The program code optimizes objective functions subject to the constraint by utilizing one or more constraint solvers to compute an input-output pair (1140). The program code determines if the computed input-output pair, is within an error tolerance of an input-output pair produced by a cyber physical system evaluator (1150). Based on determining that the computed input-output pair is within the error tolerance, the program code selects an action (1155) from the group consisting of: utilizing the computed input-output pair as a solution (1160) and adding the computed input-out pair to the training set to generate an updated training set (1170). After updating the training set, as illustrated in FIG. 11, certain aspects of the process are repeated and a new input-output pair is generated by the program code. As discussed herein, the repetitions can be for a set number of times. Based on determining that the computed input-output pair is not within the error tolerance, the program code adds the computed input-output pair to the training set to produce the updated training set (1180). Thus, in various embodiments of the present invention, whether or not the input-output pair is within an error tolerance, which can be a predetermined range, the program code can utilize the pair as either a solution and/or as additional training data to further train the model to derive a "best" solution.

Embodiments of the present invention include a computer-implemented method, a computer program product, and a computer system, where program code executed on one or more processors to generate input-output pairs, to form a training set for machine learning. The program code generates a machine learning model of a cyber physical system, where the generating comprises utilizing a machine learning algorithm and the training set to train the machine learning model. The program code converts the trained machine learning model into an equivalent constraint. The program code optimizes objective functions subject to the constraint by utilizing one or more constraint solvers to compute an input-output pair. The program code determines if the computed input-output pair, is within an error tolerance of an input-output pair produced by a cyber physical system evaluator. Based on determining that the computed input-output pair is within the error tolerance, the program code selects an action from the group consisting of: utilizing the computed input-output pair as a solution and adding the computed input-out pair to the training set to generate an updated training set. Based on determining that the computed input-output pair is not within the error tolerance, the program code adds the computed input-output pair to the training set to produce the updated training set.

In some embodiments of the present invention, where the action comprises adding the computed input-out pair to the training set to generate an updated training set, the program code updates the machine learning model of the cyber physical system including by utilizing the machine learning algorithm and the updated training set to re-train the machine learning model. The program code converts the re-trained machine learning model into the equivalent constraint. The program code optimizes objective functions subject to the constraint, including by utilizing the one or more constraint solvers to compute a new input-output pair. The program code determines if the computed new input-output pair is within the error tolerance of an input-output pair produced by the cyber physical system evaluator. Based on determining that the computed new input-output pair is within the error tolerance, the program code selects an action from the group consisting of: utilizing the computed new input-output pair as the solution and adding the computed new input-out pair to the updated training set. Based on determining that the computed new input-output pair is not within the error tolerance, the program code adds the computed new input-output pair to the training set to produce the updated training set.

In some embodiments of the present invention, selecting the action from the group comprises: the program code determining if the machine learning model of the cyber physical system has been trained a pre-determined number of times. Based on determining that the machine learning model of the cyber physical system has been trained the pre-determined number of times, the program code selects the action of utilizing the computed input-output pair as the solution. Based on determining that the machine learning model of the cyber physical system has not been trained the pre-determined number of times, the program code selects the action of adding the computed input-out pair to the training set to generate the updated training set.

In some embodiments of the present invention, the machine learning algorithm comprises a neural network.

In some embodiments of the present invention, the program code generating the input-output pairs, to form the training set comprises: the program code sampling, one or more points in a cyber physical system as input points for the input-output pairs; and the program code utilizing, for each point sampled of the one or more points sampled, a cyber physical system evaluator to compute an associated output, where the associated outputs comprise output points for the input-output pairs.

In some embodiments of the present invention, where the computed input-output pair is not within the error tolerance, the method further comprises: the program code updating the machine learning model of the cyber physical system, where the updating comprises utilizing the machine learning algorithm and the updated training set to re-train the machine learning model, converting the re-trained machine learning model into the equivalent constraint, optimizing, objective functions subject to the constraint, where the optimizing comprises utilizing the one or more constraint solvers to compute a new input-output pair, and determining, if the computed new input-output pair is within the error tolerance of an input-output pair produced by the cyber physical system evaluator.

In some embodiments of the present invention, based on determining that the computed new input-output pair is within the error tolerance, the program code selects an action from the group consisting of: utilizing the computed new input-output pair as the solution and adding the computed new input-out pair to the updated training set.

In some embodiments of the present invention, based on the program code determining that the computed new input-output pair is not within the error tolerance, the program code adds the computed new input-output pair to the updated training set to produce a further updated training set.

In some embodiments of the present invention, where the computed input-output pair is not within the error tolerance, the program code re-optimizes the objective functions subject to the constraint, where the re-optimizing comprises utilizing the one or more constraint solvers to compute a new input-output pair.

In some embodiments of the present invention, converting the trained machine learning model into the equivalent constraint comprises: the program code compressing the trained machine learning model, and the program code converting the compressed trained machine learning model into the equivalent constraint.

In some embodiments of the present invention, the trained machine learning model comprises a trained neural network and compressing the trained neural network comprises utilizing a neural network compression technique.

Figure 12:
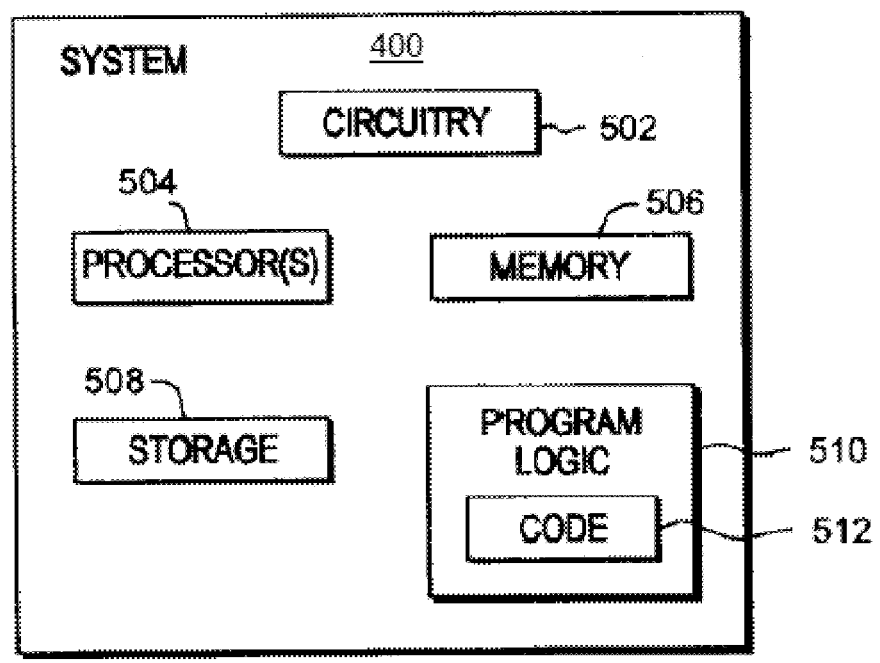
FIG. 12 illustrates a block diagram of a resource 400 in computer system, such as, which is part of the technical architecture of certain embodiments of the technique.

FIG. 12 illustrates a block diagram of a resource 400 in computer system, such as, which is part of the technical architecture of certain embodiments of the technique. Returning to FIG. 12, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 12 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 13:
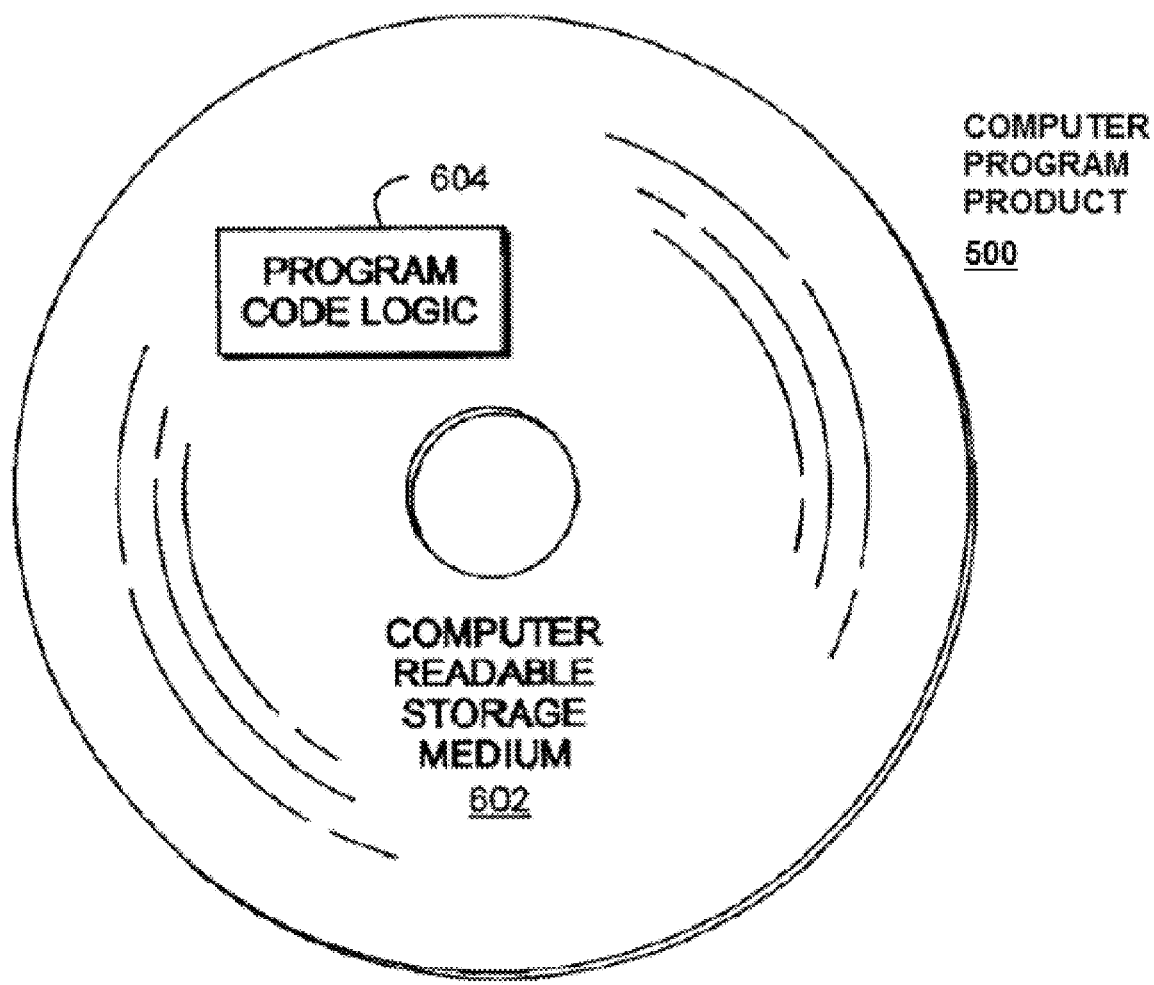
FIG. 13 is a computer program product that can be utilized in certain embodiments of the present invention.

Using the processing resources of a resource 400 to execute software, computer-readable code or instructions, does not limit where this code can be stored. Referring to FIG. 13, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PUP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method comprising:
generating, by one or more processors, input-output pairs, to form a training set for machine learning based on obtaining data from sensing capabilities of a cyber physical system, via communication capabilities of the cyber physical system;
generating, by the one or more processors, a machine learning model of the cyber physical system comprising objective functions, wherein the generating comprises utilizing a machine learning algorithm and the training set to train the machine learning model, and wherein the cyber physical system comprises one or more physical devices with integrated networking capabilities, the communication capabilities, the sensing capabilities, computation capabilities, and control capabilities;
converting, by the one or more processors, the trained machine learning model into an equivalent constraint, wherein the trained machine learning model comprises a neural network and the converting comprises compressing the neural network into the equivalent constraint, wherein the equivalent constraint comprises a mixed integer linear program (MILP);
optimizing, by the one or more processors, the objective functions subject to the constraint, wherein the optimizing comprises utilizing one or more constraint solvers to compute an input-output pair;
determining, by the one or more processors, that the computed input-output pair is not within a pre-defined error tolerance of an input-output pair produced by a cyber physical system evaluator;
based on the determining that the computed input-output pair is not within the pre-defined error tolerance, iteratively repeating a process until reaching an iteration when the computed input-output pair is within the pre-defined tolerance or reaching a pre-determined number of times for training the cyber physical system, the process comprising, for each iteration:
adding the computed input-output pair to the training set to generate new training instances for each of the objective functions;
updating, by the one or more processors, the machine learning model of the cyber physical system, wherein the updating comprises utilizing the machine learning algorithm and the updated training set to re-train the machine learning model;
converting, by the one or more processors, the re-trained machine learning model into the equivalent constraint;
optimizing, by the one or more processors, objective functions subject to the constraint, wherein the optimizing comprises utilizing the one or more constraint solvers to compute a new input-output pair; and
determining, by the one or more processors, if the computed new input-output pair is within the pre-defined error tolerance of an input-output pair produced by the cyber physical system evaluator; and
based on reaching the iteration when the computed input-output pair is within the pre-defined tolerance, the method further comprises:
utilizing the computed new input-output pair as the solution, wherein the utilizing comprises automatically maneuvering within a given amount of time, via the control capabilities of the cyber physical system, the cyber physical system, according to a value of each value in the new input-output pair, wherein each value is a navigational value and one navigational value is a position changing maneuver, wherein based on the maneuvering within the given amount of time, the cyber physical system avoids obstacles identified utilizing the sensing capabilities.

2. The computer-implemented method of claim 1, wherein based on reaching a pre-determined number of times for training the cyber physical system, the method further comprises:
utilizing the computed input-output pair as the solution.

3. The computer-implemented method of claim 1, wherein generating the input-output pairs, to form the training set comprises:
sampling, by the one or more processors, one or more points in the cyber physical system as input points for the input-output pairs; and
utilizing, by the one or more processors, for each point sampled of the one or more points sampled, the cyber physical system evaluator to compute an associated output, wherein the associated outputs comprise output points for the input-output pairs.

4. The computer-implemented method of claim 1, the method further comprising:
re-optimizing, by the one or more processors, the objective functions subject to the constraint, wherein the re-optimizing comprises utilizing the one or more constraint solvers to compute a new input-output pair.

5. The computer-implemented method of claim 1, further comprising:
prior to converting the compressed trained machine learning model into the equivalent constraint, compressing, by the one or more processors, the trained machine learning model.

6. A computer program product comprising:
a computer readable storage medium readable by one or more processors and storing instructions for execution by the one or more processors for performing a method comprising:
generating, by the one or more processors, input-output pairs, to form a training set for machine learning based on obtaining data from sensing capabilities of a cyber physical system, via communication capabilities of the cyber physical system;
generating, by the one or more processors, a machine learning model of the cyber physical system comprising objective functions, wherein the generating comprises utilizing a machine learning algorithm and the training set to train the machine learning model, and wherein the cyber physical system comprises one or more physical devices with integrated networking capabilities, the communication capabilities, the sensing capabilities, computation capabilities, and control capabilities;
converting, by the one or more processors, the trained machine learning model into an equivalent constraint, wherein the trained machine learning model comprises a neural network and the converting comprises compressing the neural network into the equivalent constraint, wherein the equivalent constraint comprises a mixed integer linear program (MILP);
optimizing, by the one or more processors, the objective functions subject to the constraint, wherein the optimizing comprises utilizing one or more constraint solvers to compute an input-output pair;

determining, by the one or more processors, that the computed input-output pair is not within a pre-defined error tolerance of an input-output pair produced by a cyber physical system evaluator;

based on the determining that the computed input-output pair is not within the pre-defined error tolerance, iteratively repeating a process until reaching an iteration when the computed input-output pair is within the pre-defined tolerance or reaching a pre-determined number of times for training the cyber physical system, the process comprising, for each iteration:

adding the computed input-output pair to the training set to generate new training instances for each of the objective functions;

updating, by the one or more processors, the machine learning model of the cyber physical system, wherein the updating comprises utilizing the machine learning algorithm and the updated training set to re-train the machine learning model;

converting, by the one or more processors, the re-trained machine learning model into the equivalent constraint;

optimizing, by the one or more processors, objective functions subject to the constraint, wherein the optimizing comprises utilizing the one or more constraint solvers to compute a new input-output pair; and determining, by the one or more processors, if the computed new input-output pair is within the pre-defined error tolerance of an input-output pair produced by the cyber physical system evaluator; and based on reaching the iteration when the computed input-output pair is within the pre-defined tolerance, the method further comprises:

utilizing the computed new input-output pair as the solution, wherein the utilizing comprises automatically maneuvering within a given amount of time, via the control capabilities of the cyber physical system, the cyber physical system, according to a value of each value in the new input-output pair, wherein each value is a navigational value and one navigational value is a position changing maneuver, wherein based on the maneuvering within the given amount of time, the cyber physical system avoids obstacles identified utilizing the sensing capabilities.

7. The computer program product of claim 6, wherein based on reaching a pre-determined number of times for training the cyber physical system, the method further comprises:

utilizing the computed input-output pair as the solution.

8. The computer program product of claim 6, wherein generating the input-output pairs, to form the training set comprises:

sampling, by the one or more processors, one or more points in the cyber physical system as input points for the input-output pairs; and utilizing, by the one or more processors, for each point sampled of the one or more points sampled, the cyber physical system evaluator to compute an associated output, wherein the associated outputs comprise output points for the input-output pairs.

9. A system comprising:

one or more memories;

one or more processors in communication with the one or more memories;

program instructions executable by the one or more processors via the one or more memories to perform a method, the method comprising:

generating, by the one or more processors, input-output pairs, to form a training set for machine learning based on obtaining data from sensing capabilities of a cyber physical system, via communication capabilities of the cyber physical system;

generating, by the one or more processors, a machine learning model of the cyber physical system comprising objective functions, wherein the generating comprises utilizing a machine learning algorithm and the training set to train the machine learning model, and wherein the cyber physical system comprises one or more physical devices with integrated networking capabilities, the communication capabilities, the sensing capabilities, computation capabilities, and control capabilities;

converting, by the one or more processors, the trained machine learning model into an equivalent constraint, wherein the trained machine learning model comprises a neural network and the converting comprises compressing the neural network into the equivalent constraint, wherein the equivalent constraint comprises a mixed integer linear program (MILP);

optimizing, by the one or more processors, the objective functions subject to the constraint, wherein the optimizing comprises utilizing one or more constraint solvers to compute an input-output pair;

determining, by the one or more processors, that the computed input-output pair is not within a pre-defined error tolerance of an input-output pair produced by a cyber physical system evaluator;

based on the determining that the computed input-output pair is not within the pre-defined error tolerance, iteratively repeating a process until reaching an iteration when the computed input-output pair is within the pre-defined tolerance or reaching a pre-determined number of times for training the cyber physical system, the process comprising, for each iteration:

adding the computed input-output pair to the training set to generate new training instances for each of the objective functions;

updating, by the one or more processors, the machine learning model of the cyber physical system, wherein the updating comprises utilizing the machine learning algorithm and the updated training set to re-train the machine learning model;

converting, by the one or more processors, the re-trained machine learning model into the equivalent constraint;

optimizing, by the one or more processors, objective functions subject to the constraint, wherein the optimizing comprises utilizing the one or more constraint solvers to compute a new input-output pair; and determining, by the one or more processors, if the computed new input-output pair is within the pre-defined error tolerance of an input-output pair produced by the cyber physical system evaluator; and based on reaching the iteration when the computed input-output pair is within the pre-defined tolerance, the method further comprises:
utilizing the computed new input-output pair as the solution, wherein the utilizing comprises automatically maneuvering within a given amount of time, via the control capabilities of the cyber physical system, the cyber physical system, according to a value of each value in the new input-output pair, wherein each value is a navigational value and one navigational value is a position changing maneuver, wherein based on the maneuvering within the given amount of time, the cyber physical system avoids obstacles identified utilizing the sensing capabilities.

10. The computer-implemented method of claim 1, wherein the position changing maneuver is in three-dimensional space.

* * * * *